United States Patent
Takeda et al.

(10) Patent No.: US 11,732,173 B2
(45) Date of Patent: Aug. 22, 2023

(54) SURFACE-TREATED AGGREGATED BORON NITRIDE POWDER, AGGREGATED BORON NITRIDE POWDER, AND THERMALLY CONDUCTIVE RESIN COMPOSITION

(71) Applicant: DENKA COMPANY LIMITED, Tokyo (JP)

(72) Inventors: Go Takeda, Omuta (JP); Yoshitaka Taniguchi, Omuta (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 17/588,757

(22) Filed: Jan. 31, 2022

(65) Prior Publication Data
US 2022/0154060 A1 May 19, 2022

Related U.S. Application Data

(62) Division of application No. 16/339,978, filed as application No. PCT/JP2017/031355 on Aug. 31, 2017, now Pat. No. 11,268,004.

(30) Foreign Application Priority Data

Oct. 7, 2016 (JP) ................... 2016-198961
Nov. 25, 2016 (JP) ................... 2016-229343

(51) Int. Cl.
| | | |
|---|---|---|
| C08K 5/14 | (2006.01) | |
| C09K 5/14 | (2006.01) | |
| C01B 21/064 | (2006.01) | |
| C08K 3/38 | (2006.01) | |
| C08K 9/02 | (2006.01) | |
| C08K 9/04 | (2006.01) | |
| C09C 3/00 | (2006.01) | |
| C09C 3/04 | (2006.01) | |
| C09C 3/06 | (2006.01) | |
| C09C 3/08 | (2006.01) | |

(52) U.S. Cl.
CPC ............ *C09K 5/14* (2013.01); *C01B 21/0645* (2013.01); *C01B 21/0648* (2013.01); *C08K 3/38* (2013.01); *C08K 9/02* (2013.01); *C08K 9/04* (2013.01); *C09C 3/006* (2013.01); *C09C 3/041* (2013.01); *C09C 3/066* (2013.01); *C09C 3/08* (2013.01); *C01P 2002/76* (2013.01); *C01P 2004/03* (2013.01); *C01P 2004/50* (2013.01); *C01P 2004/61* (2013.01); *C01P 2004/80* (2013.01); *C01P 2006/32* (2013.01); *C08K 2003/385* (2013.01); *C08K 2201/001* (2013.01); *C08K 2201/004* (2013.01); *C08K 2201/005* (2013.01)

(58) Field of Classification Search
CPC ... C08K 5/14; C08K 3/38; C08K 9/02; C08K 9/04; C08K 2003/385; C08K 2201/001; C08K 2201/004; C08K 2201/005; C01B 21/06; C01B 21/0648; C01B 21/064; C09C 3/006; C09C 3/041; C09C 3/066; C09C 3/08; C09C 1/00; C09C 3/12; C01P 2002/76; C01P 2004/03; C01P 2004/50; C01P 2004/61; C01P 2004/80; C01P 2006/32; C01P 2004/54; C08L 101/00

USPC .......................................... 523/212
See application file for complete search history.

(56) References Cited

U.S. PATENT DOCUMENTS

| | | | |
|---|---|---|---|
| 6,096,671 A | 8/2000 | Kawasaki et al. | |
| 6,645,612 B2 | 11/2003 | Pujari et al. | |
| 6,951,583 B2 | 10/2005 | Clere et al. | |
| 8,193,633 B2 | 6/2012 | Mimura et al. | |
| 8,679,429 B2 | 3/2014 | Gohara et al. | |
| 9,371,449 B2* | 6/2016 | Engler | C04B 35/6303 |
| 10,414,653 B2 | 9/2019 | Ikemiya et al. | |
| 10,752,503 B2* | 8/2020 | Takeda | C01B 21/064 |
| 11,268,004 B2* | 3/2022 | Takeda | C09C 3/12 |
| 2007/0041918 A1 | 2/2007 | Meneghetti et al. | |
| 2012/0196128 A1 | 8/2012 | Gohara et al. | |
| 2015/0152251 A1 | 6/2015 | Koshida et al. | |
| 2016/0340191 A1 | 11/2016 | Ikemiya et al. | |
| 2020/0247672 A1 | 8/2020 | Takeda et al. | |

(Continued)

FOREIGN PATENT DOCUMENTS

| | | |
|---|---|---|
| CN | 101157770 A | 4/2008 |
| CN | 102574684 A | 7/2012 |

(Continued)

OTHER PUBLICATIONS

PCT/ISA/210, "International Search Report for International Application No. PCT/JP2017/031355," dated Oct. 17, 2017.

(Continued)

*Primary Examiner* — Hannah J Pak
(74) *Attorney, Agent, or Firm* — Manabu Kanesaka

(57) ABSTRACT

A surface-treated aggregated boron nitride powder is prepared by using the boron nitride powder as the raw material, adding an oxidizer to the boron nitride aggregated grains, wet-pulverizing or wet-crushing the grains for surface modification treatment of the particles and allowing reaction of the particles with a metal coupling agent. The surface-treated boron nitride aggregated grains are formed by aggregation of hexagonal h-BN primary particles; (B) have any one or more of Si, Ti, Zr, Ce, Al, Mg, Ge, Ga, and V in an amount of 0.1 atm % or more and 3.0 atm % or less in its composition on the surface of 10 nm; (C) have a crushing strength of 5 MPa or more; and (D) have an average particle diameter of 20 μm or more and 100 μm or less.

8 Claims, 1 Drawing Sheet

(56) References Cited

U.S. PATENT DOCUMENTS

| | | | |
|---|---|---|---|
| 2021/0163288 A1 | 6/2021 | Takeda et al. | |
| 2022/0153583 A1* | 5/2022 | Takeda | C08K 9/06 |
| 2022/0154059 A1* | 5/2022 | Takeda | C01B 21/0645 |

FOREIGN PATENT DOCUMENTS

| | | | |
|---|---|---|---|
| CN | 105026312 A | 11/2015 | |
| JP | H09-202663 A | 8/1997 | |
| JP | H10-053405 A | 2/1998 | |
| JP | 2000-007310 A | 1/2000 | |
| JP | 2000-154265 A | 6/2000 | |
| JP | 2003-531802 A | 10/2003 | |
| JP | 2004-537489 A | 12/2004 | |
| JP | 2006-257392 A | 9/2006 | |
| JP | 2007-502770 A | 2/2007 | |
| JP | 2011-098882 A | 5/2011 | |
| JP | 2014-040341 A | 3/2014 | |
| JP | 2015-036361 A | 2/2015 | |
| JP | 2015-518808 A | 7/2015 | |
| JP | 2015-196632 A | 11/2015 | |
| KR | 1020120101345 A | 9/2012 | |
| KR | 1020150016957 A | 2/2015 | |
| TW | 201536715 A | 10/2015 | |
| WO | 2005/021428 A1 | 3/2005 | |
| WO | 2012-027194 A2 | 3/2012 | |
| WO | 2014/003193 A1 | 1/2014 | |
| WO | 2015/119198 A1 | 8/2015 | |
| WO | 2016/092951 A1 | 6/2016 | |
| WO | 2016/092952 A1 | 6/2016 | |

OTHER PUBLICATIONS

Taiwan Patent Office, "Office Action for Taiwanese Patent Application No. 106131524," dated Jun. 2, 2021.
Korea Patent Office, "Notice of Allowance for Korean Patent Application No. 10-2019-7007778," dated Sep. 27, 2021.
Japan Patent Office, "Decision of Grant for Japanese Patent Application No. 2018-543782," dated Mar. 10, 2020.

* cited by examiner

SURFACE-TREATED AGGREGATED BORON NITRIDE POWDER, AGGREGATED BORON NITRIDE POWDER, AND THERMALLY CONDUCTIVE RESIN COMPOSITION

CROSS-REFERENCE TO RELATED APPLICATION

This is a divisional patent application of Ser. No. 16/339,978 filed on Apr. 5, 2019, which is National Phase of International Application No. PCT/JP2017/031355 filed Aug. 31, 2017, and claims priorities from Japanese Applications No. 2016-198961, filed Oct. 7, 2016 and No. 2016-229343 filed Nov. 25, 2016, the disclosures of which are hereby incorporated by reference herein in its entirety.

TECHNICAL FIELD

The present invention relates to a surface-treated aggregated boron nitride (BN) powder, aggregated boron nitride powder, and thermally conductive resin composition.

BACKGROUND ART

It is an important problem for heat-generating electronic parts such as power devices, transistors, thyristors, and CPUs to dissipate efficiently the heat generated during use. Generally as measures for such heat dissipation, (1) the thermal conductance of the insulation layer formed on the printed wiring board on which heat-generating electronic parts are mounted was increased or (2) a heat-generating electronic part or a printed wiring board carrying a heat-generating electronic part was adhered to a heat sink via an electrically insulating thermal interface material. A mixture of a silicone or epoxy resin with a ceramic powder has been used for the insulation layer of printed wiring boards and the thermal interface material.

Recently, increase in speed and integration of circuits in heat-generating electronic parts and also increase in mounting density of heat-generating electronic parts on printed wiring boards lead to increased heat generation density in electronic devices, year by year. There is thus an increasing demand for a higher-thermal conductivity ceramic powder.

Under the circumstances above, a hexagonal boron nitride powder, which has favorable properties as an electrical insulating material such as high thermal conductivity, high insulating property, and low dielectric constant, is attracting attention.

However, the hexagonal boron nitride particles, which have a thermal conductivity of 400 W/(m·K) in the in-plane direction (a-axis direction), but have a thermal conductivity of 2 W/(m·K) in the thickness direction (c-axis direction), show large anisotropy in thermal conductivity due to their crystal structure and scaly shape. Further when the hexagonal boron nitride powder is mixed with a resin, the particles are oriented in the same direction.

As a result, the in-plane direction (a-axis direction) of the hexagonal boron nitride particle becomes vertical to the thickness direction of the thermal interface material, for example during production of a thermal interface material, prohibiting efficient utilization of the high thermal conductivity of the hexagonal boron nitride particle in the in-plane direction (a-axis direction).

Patent Document 1 proposes a product in which the in-plane direction (a-axis direction) of hexagonal boron nitride particles are oriented in the thickness direction of a high-heat conduction sheet, and such a product utilizes efficiently the high thermal conductivity of the hexagonal boron nitride particle in the in-plane direction (a-axis direction).

However, it is needed to (1) laminate the oriented sheet in the following step, making the production process complicated, and to (2) cut the product to a thin sheet after lamination and hardening, making it difficult to ensure the dimensional accuracy of the thickness of the sheet. As the hexagonal boron nitride particles have a scaly shape, they lead to increase in viscosity and decrease in flowability when mixed with a resin, prohibiting mixing at a higher rate.

Boron nitride powders in various shapes that are smaller in the anisotropy in thermal conductivity of the hexagonal boron nitride particles were proposed to overcome these problems.

Patent Document 2 proposes a boron nitride powder smaller in anisotropy in thermal conductivity in which the primary-particle hexagonal boron nitride particles are aggregated as they are not oriented in the same directional.

Aggregated boron nitrides prepared by other known production methods include a spherical boron nitride prepared by spray-drying method (Patent Document 3), an aggregated boron nitride prepared using boron carbide as the raw material (Patent Document 4), and an aggregated boron nitride prepared by repeated pressurization and crushing (Patent Document 5).

CITATION LIST

Patent Documents

Patent Document 1: JP-A No. 2000-154265
Patent Document 2: JP-A No. H09-202663
Patent Document 3: JP-A No. 2014-40341
Patent Document 4: JP-A No. 2011-98882
Patent Document 5: JP-T No. 2007-502770
Patent Document 6: JP-A No. 2011-98882
Patent Document 7: JP-T No. 2007-502770
Patent Document 8: JP-A No. 2006-257392
Patent Document 9: JP-A No. 2015-36361

SUMMARY OF THE INVENTION

Technical Problem

However, the aggregate particles prepared by the method described in Patent Document 1 had lower grain strength and disintegrated even under weak shearing stress, and thus did not give sufficiently high heat conductivity.

The aggregated boron nitride powder described in Patent Document 2, the spherical boron nitride described in Patent Document 3, the aggregated boron nitride described in Patent Document 4, and the aggregated boron nitride described in Patent Document 5 had a crushing strength of 5.1 MPa or less and were not strong enough for processing in high-stress means such as three-roll mills, ultrasonicators and presses in the process of mixing with a resin and sheeting of the mixture from the viewpoint of aggregation strength. There is thus a demand for a higher-strength aggregated boron nitride powder.

A main object of the present invention is to provide a boron nitride powder superior in thermal conductivity and higher in grain strength.

Solution to Problem

After intensive studies, the inventors have made the present invention.

Specifically, the inventors have made intensive studies on a boron nitride powder containing boron nitride aggregated grains prepared from boron carbide as the raw material. As a result, the inventors have found that it is possible to produce a boron nitride powder containing boron nitride aggregated grains that are higher in grain strength and uniform in primary particle size, have a dense structure and are thus favorable as a thermally conductive filler, by (a) pressure-nitridating and calcining a boron carbide adjusted to a particular average particle diameter and a carbon content in a pressure-nitridating and calcining step and (b) heating the boron carbide nitride after pressure nitridation and calcination to a temperature allowing initiation of decarburization, heating it to a retention temperature at a particular heating rate and heating it at the particular temperature for a certain period in a decarburization crystallization step.

Patent Document 4 describes a method for producing a hexagonal boron nitride powder, wherein the hexagonal boron nitride powder is subjected to a reduced pressure treatment under a furnace internal pressure held at less than 100 KPa after the decarburization treatment (e.g., see Claim 6 and FIG. 1).

Alternatively, Patent Document 5 describes a method for producing an aggregated boron nitride powder, wherein a raw material boron nitride having an average crystal size of 5 µm or less (favorably, 2 µm or less) is once heat-treated and the resulting aggregate is pulverized and classified repeatedly (e.g., see original Claims 30 to 33, Examples 1 to 7, and FIG. 1).

Thus, the production method according to the present invention is different in its characteristic configuration and technological idea from these production methods.

The inventors have found that the aggregated boron nitride powder described above is a boron nitride powder (A) containing aggregates of scaly hexagonal boron nitride primary particles having a size in a particular range, (B) containing boron nitride aggregated grains having a high grain strength and (C) having a particular average particle diameter and also that the boron nitride powder is a new compound. The inventors also found that it is possible to produce an aggregated boron nitride powder further superior in filling property into resin to this new boron nitride powder by subjecting the new compound to a special surface treatment. Accordingly, the present invention provides the followings inventions [1] to [11].

The present invention provides the followings:

[1] A boron nitride powder comprising boron nitride aggregated grains that are formed by aggregation of scaly hexagonal boron nitride primary particles, the boron nitride powder having the following characteristics (A) to (C):
(A) the primary particles of the scaly hexagonal boron nitride have an average long side length of 1.5 µm or more and 3.5 µm or less and a standard deviation of 1.2 µm or less;
(B) the boron nitride aggregated grains have a grain strength of 8.0 MPa or more at a cumulative breakdown rate of 63.2% and a grain strength of 4.5 MPa or more at a cumulative breakdown rate of 20.0%; and
(C) the boron nitride powder has an average particle diameter of 20 µm or more and 100 µm or less.

[2] The boron nitride powder described in [1] above, wherein the average particle diameter of the boron nitride powder (C) is 30 µm or more and 80 µm or less.

[3] The boron nitride powder described in [1] or [2] above, prepared by a method for producing a boron nitride powder characterized by the steps of;
(a) pressure-nitridating and calcining a boron carbide having an average particle diameter of 6 µm or more and 55 µm or less and a carbon content of 18% or more and 21% or less and
(b) heat-treating the boron carbide by heating it to a temperature allowing initiation of decarburization, heating it to a retention temperature at a heating rate of 5° C./min or less, and heating it at a temperature of 1750° C. or higher for a period longer than 0.5 hour and shorter than 40 hours in a decarburization crystallization step after the pressure nitridation and calcination.

[4] The boron nitride powder described in [3] above, wherein the boron carbide is pressure-nitridated and calcined at a temperature of 1800° C. or higher and at a pressure of 0.7 MPa or more and 1.0 MPa or less in the step (a).

The present invention also provides the followings:

[5] A surface-treated aggregated boron nitride powder, prepared by using the boron nitride powder described in [1] or [3] above as the raw material, adding an oxidizer to the boron nitride aggregated grains, wet-pulverizing or wet-crushing the grains for surface modification treatment of the particles, and allowing reaction of the particles with a metal coupling agent, the powder having the following characteristics (A) to (D):
(A) the surface-treated boron nitride aggregated grains are formed by aggregation of hexagonal h-BN primary particles;
(B) the surface-treated boron nitride aggregated grains have any one or more of Si, Ti, Zr, Ce, Al, Mg, Ge, Ga, and V in an amount of 0.1 atm % or more and 3.0 atm % or less in its composition on the surface of 10 nm;
(C) the surface-treated boron nitride aggregated grains have a crushing strength of 5 MPa or more; and
(D) the surface-treated aggregated boron nitride powder has an average particle diameter of 20 µm or more and 100 µm or less.

[6] The surface-treated aggregated boron nitride powder described in [5] above, prepared as the oxidizer and a water-soluble solvent are added during the surface modification treatment.

[7] The surface-treated aggregated boron nitride powder described in [5] or [6] above, wherein the metal coupling agent is one or more coupling agents selected from titanium coupling agents, silane coupling agents, zirconium coupling agents, and aluminum coupling agents.

The present invention further provides the followings:

[8] An aggregated boron nitride powder, characterized by having the following characteristics (A) to (D):
(A) the boron nitride aggregated grains are formed by aggregation of hexagonal h-BN primary particles;
(B) the boron nitride aggregated grains have any one or more of Si, Ti, Zr, Ce, Al, Mg, Ge, Ga, and V in an amount of 0.1 atm % or more and 3.0 atm % or less in its composition on the surface of 10 nm;
(C) the boron nitride aggregated grains have a crushing strength of 5 MPa or more; and
(D) the aggregated boron nitride powder has an average particle diameter of 20 µm or more and 100 µm or less.

[9] The aggregated boron nitride powder described in [8] above, characterized additionally by having the following characteristic:
(E) the boron nitride aggregated grains have organic functional groups on the surface.

[10] The aggregated boron nitride powder described in [8] or [9] above, wherein the organic functional group present on the surface of the boron nitride aggregated grains is one or more groups selected from epoxy groups that may be substituted, styryl groups that may be substituted, alkyl groups that may be substituted, vinyl groups that may be substituted, acetylacetate groups that may be substituted, acyl groups that may be substituted, isocyanate groups that may be substituted, cyclohexyl groups that may be substituted, and tetraoctyl bis(ditridecyl phosphite) groups that may be substituted.

The present invention further provides the following:
[11] A thermally conductive resin composition, comprising the aggregated boron nitride powder described in [1], [5] or [8] above.

Advantageous Effects of Invention

The present invention provides a boron nitride powder superior in thermal conductivity and higher in grain strength. It should be understood that the advantageous effects described herein are not particularly limited and may be any of the effects described in the present description.

BRIEF DESCRIPTION OF DRAWINGS

FIG. 2 shows the boron nitride aggregated grains.

DESCRIPTION OF EMBODIMENTS

Hereinafter, favorable embodiments of the present invention will be described. The embodiments described below are only examples of the typical embodiments of the present invention and it should be understood that the scope of the present invention shall not be restricted thereby.

The first and second embodiments of the present invention relate to boron nitride aggregated grains, a method for producing the same, and a thermally conductive resin composition comprising the same.

More specifically, the first and second embodiments of the present invention relates to a boron nitride (BN) powder, a method for producing the same and an application thereof. In particular, the first and second embodiments of the present invention relates to a boron nitride powder, a method for producing the same and a thermally conductive resin composition comprising the same.

<1-1. Boron Nitride Powder in the First Embodiment of the Present Invention>

Figure 1:
FIG. 1 is a photograph of the boron nitride powder prepared by the production method in the first embodiment of the present invention. The boron nitride powder contains boron nitride aggregated grains.
Figure 2:
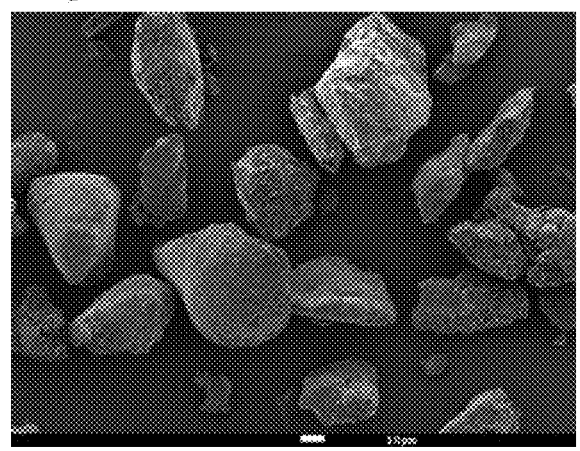
FIG. 2 is a scanning electron micrograph of the boron nitride aggregated grains present in the boron nitride powder prepared by the production method in the first embodiment of the present invention.
Figure 3:
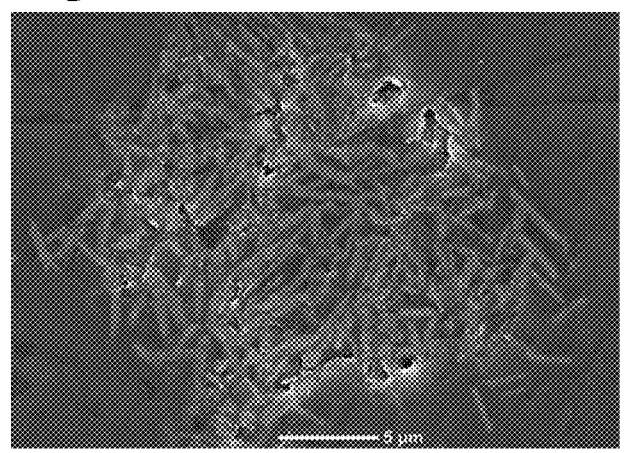
FIG. 3 is a scanning electron micrograph showing a sectional view of the boron nitride aggregated grains present in the boron nitride powder prepared by the production method in the first embodiment of the present invention. It is shown that multiple scaly hexagonal boron nitride (primary particles) are present in the boron nitride aggregated grains. The photograph also shows that multiple primary particles make a bulky mass by aggregation, forming a boron nitride aggregated grain.

The first embodiment according to the present invention relates to a boron nitride powder comprising boron nitride aggregated grains that are formed by aggregation of the following scaly hexagonal boron nitride primary particles (A) (e.g., see FIGS. 1 to 3).

The boron nitride powder preferably has a carbon content of 0.2% or less, more preferably 0.1% or less.

(A) The primary particles of the scaly hexagonal boron nitride preferably have an average long side length of 1.5 µm or more and 3.5 µm or less and a standard deviation of 1.2 µm or less.

(B) The aggregated grains of the aggregated boron nitride powder preferably have a grain strength of 8.0 MPa or more at a cumulative breakdown rate of 63.2% and a grain strength of 4.5 MPa or more at a cumulative breakdown rate of 20.0%.

(C) The boron nitride powder preferably has an average particle diameter of 20 µm or more and 100 µm or less.

<1-1. (A) Scaly Hexagonal Boron Nitride (Primary Particles)>

The primary particles of "(A) the scaly hexagonal boron nitride (primary particles)" in the first embodiment of the present invention preferably have an average long side length of 1.5 µm or more and 3.5 µm or less, more preferably 1.7 µm or more and 3.2 µm or less, yet more preferably 2.0 µm or more and 3.0 µm or less.

When the primary particles have an average long side length of more than 3.5 µm, aggregated grains formed by aggregation of the primary particles may become coarser inside, leading to deterioration in grain strength. Alternatively when the primary particles have an average long side length of less than 1.5 µm, the primary particles may become smaller, leading to deterioration in thermal conductivity.

The primary particles of the "(A) scaly hexagonal boron nitride (primary particles)" in the first embodiment of the present invention preferably have a standard deviation of long side length at 1.2 µm or less, more preferably 1.0 µm or less, and yet more preferably 0.8 µm or less. When the standard deviation is more than 1.2 µm, the particles may not have a uniform structure, leading to deterioration in grain strength. Although the minimum allowable value of the standard deviation of long side length of the primary particles is not particularly limited, as the particles become more resistant to penetration by resins, possibly leading to generation of voids and others and thus to deterioration in dielectric breakdown properties when the particles have an excessively uniform and dense structure, the standard deviation of long side length of the primary particles is preferably 0.2 µm or more, more preferably 0.4 µm or more.

<1-1. (B) Boron Nitride Aggregated Grains>

The aggregated grains of the "(B) boron nitride aggregated grains" in the first embodiment of the present invention preferably have a grain strength of 8.0 MPa or more at a cumulative breakdown rate of 63.2% and a grain strength of 4.5 MPa or more at a cumulative breakdown rate of 20.0%. When the aggregated grains have a grain strength smaller than that described above, the aggregate particles may be broken down by the stress caused by kneading with resin or pressurization, possibly leading to deterioration in thermal conductivity.

The aggregated grains more preferably have a grain strength of 8.0 MPa or more, yet more preferably 9.0 MPa or more, at a cumulative breakdown rate of 63.2%.

The maximum allowable value of the grain strength of the aggregated grains at a cumulative breakdown rate of 63.2% is not particularly limited, but may be, for example, 50 MPa, 40 MPa, 30 MPa, or 20 MPa.

The aggregated grains more preferably have a grain strength of 4.5 MPa or more, yet more preferably 5.0 MPa or more, at a cumulative breakdown rate of 20.0%. The maximum allowable value of the grain strength of the aggregated grains at a cumulative breakdown rate of 20.0% is not particularly limited, but may be, for example, 20 MPa or 13 MPa.

High-strength boron nitride aggregated grains are preferable for use as a raw material during the surface modification treatment in the <2-1. aggregated boron nitride fine powder in the third embodiment of the present invention> described below, and higher-strength boron nitride aggregated grains, such as the aggregated grains having a grain strength of 20 MPa to 50 MPa at a cumulative breakdown rate of 63.2%, are more preferable.

<1-1. (C) Boron Nitride Powder>

The boron nitride powder of the "(C) boron nitride powder" in the first embodiment of the present invention preferably has an average particle diameter of 20 μm or more, more preferably 22 μm or more, yet more preferably 30 μm or more.

The boron nitride powder preferably has an average particle diameter of 100 μm or less, more preferably 90 μm or less, yet more preferably 80 μm or less.

The boron nitride powder preferably has an average particle diameter of 20 μm or more and 100 μm or less, more preferably 30 μm or more and 80 μm or less.

An average particle diameter of less than 20 μm may lead to deterioration in thermal conductivity, as the average particle diameter becomes too small. Alternatively, an average particle diameter of more than 100 μm may make it difficult to prepare a sheet, as the difference in thickness between the average particle diameter of the boron nitride powder and the heat dissipation sheet becomes smaller.

The boron nitride powder in the first embodiment of the present invention preferably has a thermal conductivity of 10 W/mK or more.

The first embodiment according to the present invention provides a boron nitride powder superior in thermal conductivity and aggregated grain strength.

The boron nitride powder in the first embodiment of the present invention is used favorably as a raw material for heat-dissipating parts in heat-generating electronic parts, such as power devices, in particular as a material to be blended into resin compositions for an insulation layer or a thermal interface material of printed wiring boards.

<1-2. Method for Producing a Boron Nitride Powder in the First Embodiment of the Present Invention>

The boron nitride powder in the first embodiment of the present invention can be prepared by (a) pressure-nitridating and calcining boron carbide and (b) decarburizing and crystallizing the baked product after calcining.

The method for producing a boron nitride powder according to the present invention comprises the following steps (a) and (b) of
(a) pressure-nitridating and calcining a boron carbide having an average particle diameter of 6 μm or more and 55 μm or less and a carbon content of 18% or more and 21% or less, and
(b) heat-treating the boron carbide by heating it to a temperature allowing initiation of decarburization, heating it to a retention temperature at a heating rate of 5° C./min or less, and heating it at a temperature of 1750° C. or higher for a period longer than 0.5 hour and shorter than 40 hours in a decarburization crystallization step after the pressure nitridation and calcination.

<1-2. (a) Pressure-Nitridating and Calcining Step>

In the "(a) pressure-nitridating step" of the method for producing a boron nitride powder in the first embodiment of the present invention, the boron carbide having an average particle diameter of 6 μm or more and 55 μm or less and a carbon content of 18% or more and 21% or less is pressure-nitridated and calcined under an atmosphere at a particular calcining temperature and application pressure, giving a boron carbide nitride.

<1-2. (a1) Raw Material Boron Carbide Used in Pressure-Nitridating Step>

As the particle diameter of the raw material boron carbide used in the pressure-nitridating step has a significant influence of the grain size of the boron nitride aggregated grains finally prepared, a boron carbide having a proper particle diameter should be selected and use of a raw material boron carbide having an average particle diameter of 7 μm or more and 45 μm or less is desirable. It is desirable that the raw material contains a smaller amount of impurities such as boric acid and isolated carbon.

The minimum allowable value of the average particle diameter of the boron carbide is preferably 6 μm or more, more preferably 7 μm or more, yet more preferably 10 μm or more.

The maximum allowable value of the average particle diameter of the boron carbide is preferably 55 μm or less, more preferably, 50 μm or less, yet more preferably 45 μm or less.

The average particle diameter of the boron carbide is preferably 7 to 50 μm, more preferably 7 to 45 μm.

The carbon content of the raw material boron carbide used in the pressure-nitridating step is preferably lower than the content of composition $B_4C$ (21.7%) and boron carbide having a carbon content of 18.0% or more and 20.5% or less is used desirably.

The minimum allowable value of the carbon content of the boron carbide is preferably 18% or more, more preferably 19% or more.

The maximum allowable value of the carbon content of the boron carbide is preferably 21% or less, more preferably 20.5% or less.

The carbon content of the boron carbide is preferably 18.0% to 20.5%. It is because dense boron nitride aggregated grains are formed and the carbon content in the boron nitride finally prepared becomes smaller when the amount of carbon vaporized in the decarburization step is smaller. It is difficult to prepare a stable boron carbide having a carbon content of less than 18%, as such a boron carbide has a composition that deviates excessively from the theoretical composition.

Any known production method may be used as the method for producing a boron carbide and it is possible to prepare a boron carbide having a desired average particle diameter and carbon content.

For example, it is possible to prepare boron carbide lumps by mixing boric acid and acetylene black and calcining the mixture in an atmosphere of 1800 to 2400° C. for 1 to 10 hours. The lumps are then subjected to pulverization, sieving, washing, impurity removal, drying, and others, to give a boron carbide powder.

Boric acid and acetylene black, raw materials for boron carbide, are preferably mixed at a rate of 100 parts by mass of boric acid to 25 to 40 parts by mass of acetylene black.

The atmosphere under which the boron carbide is prepared is preferably an inert gas, and examples of the inert gases used include argon gas and nitrogen gas. These gases may be used alone or in combination, as needed. In particular, use of argon gas is preferable.

Any common pulverizer or crusher may be used for pulverization of the boron carbide lumps and the lumps are pulverized, for example, for approximately 0.5 to 3 hours. The boron carbide after pulverization was preferably sieved through a sieve net into grains having a grain size of 75 μm or less.

<1-2. (a2) Pressure-Nitridating and Calcining Step>

The minimum allowable value of the calcining temperature in the pressure-nitridating step is preferably 1700° C. or higher, more preferably 1800° C. or higher. The maximum allowable value of the calcining temperature is preferably 2400° C. or lower, more preferably 2200° C. The calcining temperature is more preferably 1800 to 2200° C.

The minimum allowable value of the pressure in the pressure-nitridating step is preferably 0.6 MPa or more, more preferably 0.7 MPa or more. The maximum allowable value of the calcining temperature is preferably 1.0 MPa, more preferably 0.9 MPa. The pressure is more preferably 0.7 to 1.0 MPa.

A calcining temperature of 1800° C. or higher and a pressure of 0.7 to 1.0 MPa are preferable as the condition in calcining temperature and pressure for the pressure-nitridating step.

It is because nitridation of boron carbide does not proceed sufficiently when the calcining temperature is 1800° C. and the pressure is less than 0.7 MPa. In addition, produce at a pressure of 1.0 MPa or less is desirable industrially.

The atmosphere in the pressure-nitridating step is desirably a gas permitting nitridation reaction and examples thereof include nitrogen gas, ammonia gas, and the like. These gases may be used alone or in combination of two or more. In particular, nitrogen gas is most desirable for nitridization from the point of production cost. The atmosphere preferably contains nitrogen gas at least in an amount of 95% (V/V) or more, more preferably 99.9% or more.

The calcination period in the pressure-nitridating step is preferably 6 to 30 hours, more preferably 8 to 20 hours.

<1-2. (b) Decarburization Crystallization Step>

In the "(b) decarburization crystallization step" of the method for producing a boron nitride powder according to the present invention, it is possible to prepare boron nitride aggregated grains that are formed by aggregation of primary particles (primary particles of scaly hexagonal boron nitride) by carrying out an heat treatment of heating the boron carbide nitride prepared in the pressure-nitridating step to a retention temperature at a particular heating rate under an atmosphere at normal pressure or higher and heating it in a particular temperature range for a certain period of time.

In the decarburization crystallization step, the boron carbide nitride prepared from boron carbide, as described above, is decarburized, grown to scaly grains having a particular size and aggregated, to give aggregated boron nitride grains.

Preferably in the decarburization crystallization step, the boron carbide nitride is subjected to a heat treatment of heating it to a temperature allowing initiation of decarburization in an atmosphere at normal pressure or higher, heating it to a retention temperature at a heating rate of 5° C./min or less and heating it at a temperature of 1750° C. or higher for more than 0.5 hour and less than 40 hours.

More preferably in the decarburization crystallization step, the boron carbide nitride is subjected to a heat treatment of heating it to a temperature allowing initiation of decarburization in an atmosphere at normal pressure or higher, heating it to a retention temperature at a heating rate of 5° C./min or less and heating it at a temperature of 1800° C. or higher for 1 hour or more and 30 hours or less.

Desirably in the decarburization crystallization step, boron carbide nitride prepared in the pressure-nitridating step and boric acid and/or boron oxide (with other raw materials, as needed) are mixed as the raw materials in the step and the mixture is decarburized and crystallized.

The mixing rate of boric acid and/or boron oxide to the boron carbide nitride is preferably 100 to 300 parts by mass of boric acid-boron oxide, more preferably 150 to 250 parts by mass of boric acid-boron oxide, with respect to 100 parts by mass of the boron carbide nitride.

The pressure condition of the "atmosphere of normal pressure or higher" in the decarburization crystallization step is preferably normal pressure or higher, more preferably 0.1 MPa or higher, yet more preferably 0.2 MPa or higher. The maximum allowable value of the pressure condition of the atmosphere is not particularly limited, but preferably 1 MPa or less, more preferably 0.5 MPa or less. The pressure condition is preferably 0.2 to 0.4 MPa.

The "atmosphere" in the decarburization crystallization step is preferably nitrogen gas and an atmosphere containing nitrogen gas in an amount of 90% (V/V) or more is preferable and high-purity nitrogen gas (99.9% or more) is more preferable.

The "heating" in the decarburization crystallization step may be performed in one step or in multiple steps. Multi-step heating is desirably selected for reduction of the time needed for heating to the temperature allowing initiation of decarburization.

In the "first-step heating" of the multi-step heating, the boron carbide nitride is preferably heated to the "temperature allowing initiation of decarburization".

The "temperature allowing initiation of decarburization" is not particularly limited and may be any temperature normally employed, and it may be, for example, approximately 800 to 1200° C. (favorably, approximately 1000° C.).

The "first-step heating" may be carried out, for example, at a heating rate in the range of 5 to 20° C./min, favorably 8 to 12° C./min.

A second-step heating is preferably carried out after the first-step heating. The "second-step heating" is more preferably carried out by "heating the boron carbide nitride to a desired retention temperature".

The maximum allowable value of the "second-step heating rate" is preferably 5° C./min or less, more preferably 4° C./min or less, more preferably 3° C. or lower, yet more preferably 2° C. or lower. A lower heating rate is preferable for more uniform growth of the grains.

The minimum allowable value of the "second-step heating rate" is preferably 0.1° C./min or more, more preferably 0.5° C./min or more, yet more preferably 1° C./min or more. A "second-step heating rate" of 1° C. or higher is preferable from the point of production cost, as it permits reduction in production period.

The "second-step heating rate" is favorably 0.1 to 5° C./min.

A second-step heating rate of more than 5° C./min leads to heterogeneous growth of grains and thus production of heterogeneously structured grains, possibly leading to deterioration in grain strength.

The minimum allowable value of the "particular temperature range (retention temperature after heating)" is preferably 1750° C. or higher, more preferably 1800° C. or higher, yet more preferably 2000° C. or higher. The maximum allowable value of the "retention temperature" is preferably 2200° C. or lower, more preferably 2100° C. or lower.

A retention temperature after heating of less than 1750° C. leads to insufficient growth of grains, possibly leading to reduction in thermal conductivity. A retention temperature of 1800° C. or higher easily leads to favorable growth of grains, thus improving thermal conductivity.

The "certain retention period (retention period after heating)" is preferably more than 0.5 hour and less than 40 hours.

The "retention period" is preferably 1 hour or more, more preferably 3 hours or more, yet more preferably 5 hours or more, even more preferably 10 hours or more.

The maximum allowable value of the "retention period" is preferably 30 hours or less, more preferably 20 hours.

The retention period is desirably 1 to 30 hours.

When the retention period after heating is 1 hour or more, the grains grow favorably. It is possible, when it is 30 hours or less, to prevent excessive grain growth and thus deterioration in grain strength and to avoid industrial disadvantage of extended calcination period.

The boron nitride powder in the first embodiment of the present invention can be prepared after the (a) pressure-nitridating and calcining step and the (b) decarburization crystallization step.

For reduction of the weak aggregation among aggregated grains, the boron nitride aggregated grains prepared in the decarburization crystallization step is desirably pulverized or crushed and additionally classified.

The pulverization or crushing is not particularly limited, and any common pulverizer or crusher may be used. A common sieving method giving grains having an average particle diameter of 20 μm or more and 100 μm or less may be used for classification. For example, the lumps are pulverized in a Henschel Mixer or a mortar and then classified on a vibration sieving machine.

A boron nitride powder comprising the boron nitride aggregated grains prepared by the method for producing a boron nitride powder in the first embodiment of the present invention is characterized in the same way as the <1-1. the boron nitride powder in the first embodiment of the present invention> described above.

The boron nitride aggregated grains prepared by the method for producing a boron nitride powder in the first embodiment of the present invention or the boron nitride powder comprising the boron nitride aggregated grains can be used as the raw material of the second embodiment of the present invention described below.

<1-3. Thermally Conductive Resin Composition>

The thermally conductive resin composition in the second embodiment of the present invention is characterized by comprising the boron nitride powder in the first embodiment of the present invention or a boron nitride powder prepared by the method for producing a boron nitride powder in the first embodiment of the present invention. Any known production method may be used as the method for producing a thermally conductive resin composition. The thermally conductive resin composition prepared can be used widely, for example in heat-dissipating parts.

The boron nitride powder in the third embodiment described below may be used in the thermally conductive resin composition, as it is blended with the boron nitride powder in the first embodiment of the present invention, in the range that does not impair the advantageous effects of the present invention. The boron nitride powder according to the present invention can also be used as an inorganic filler for thermally conductive resin compositions.

<Resin>

Examples of the resins used in the thermally conductive resin composition containing the boron nitride powder according to the present invention include epoxy resins, silicone resins, silicone rubbers, acrylic resins, phenol resins, melamine resins, urea resins, unsaturated polyesters, fluoroplastics, polyamides (for example, polyimides, polyamide-imides, polyether imides), polyesters (for example, polybutylene terephthalate, polyethylene terephthalate), polyphenylene ethers, polyphenylene sulfides, wholly aromatic polyesters, polysulfones, liquid crystalline polymers, polyether sulfones, polycarbonates, maleimide-modified resins, ABS resins, AAS (acrylonitrile-acrylic rubber-styrene) resins, and AES (acrylonitrile-ethylene-propylene-diene rubber-styrene) resins.

In particular, epoxy resins (favorably, naphthalene-type epoxy resins), which are superior in heat resistance and adhesive strength to copper foil circuits, are favorable as an insulation layer for printed wiring boards.

In addition, silicone resins, which are superior in heat resistance, softness, and adhesiveness to heat sink, and the like, are favorable as a thermal interface material.

Typical examples of the epoxy resin hardeners include phenolic novolak resins, acid anhydride resins, amino resins, and imidazoles. Among the resins above, imidazoles are preferable.

The amount of the hardener blended is preferably 0.5 part by mass or more and 15 parts by mass or less, more preferably 1.0 part by mass or more and 10 parts by mass or less.

The amount of the boron nitride powder used in 100 vol % of the thermally conductive resin composition (i.e., the total amount of the epoxy resin and the hardener) is preferably 30 vol % or more and 85 vol % or less, more preferably, 40 vol % or more and 80 vol % or less.

A use amount of the boron nitride powder of 30 vol % or more easily leads to improvement in thermal conductivity and thus to sufficiently high heat dissipating property. When the content of the hexagonal boron nitride is 85 vol % or less, it is possible to reduce generation of voids during molding and thus to reduce deterioration in insulating property and mechanical strength.

Particularly preferably, the first and second embodiments of the present invention relates to a boron nitride powder superior in thermal conductivity to be used in the resin composition for an insulation layer and a thermal interface material of printed wiring boards, a method for producing the same and a thermally conductive resin composition comprising the same.

Specifically, the first and second embodiments of the present invention are used favorably as the raw materials for heat-dissipating parts in heat-generating electronic parts such as power devices.

The thermally conductive resin composition in the second embodiment of the present invention can be used widely, for example in heat-dissipating parts.

Another embodiment of the present invention relates to an aggregated boron nitride powder, a method for producing the same, and a thermally conductive resin composition comprising the same.

More specifically, the other embodiment of the present invention relates to an aggregated boron nitride powder that is surface-treated and thus superior in filling property into resin, a method for producing the same and a thermally conductive resin composition comprising the same.

As described above, hexagonal boron nitride (hereinafter also referred to as "h-BN") powder, which has excellent properties as an electrical insulating material such as high thermal conductivity, high insulating property, and low dielectric constant, is attracting attention.

Patent Document 1 proposes a high-heat conduction sheet in which the in-plane direction (a-axis direction) of the hexagonal boron nitride particles is oriented in the thickness direction of the high-heat conduction sheet.

Patent Document 2 proposes use of aggregated boron nitride powder in which the hexagonal boron nitride primary particles are not oriented in the same direction.

Known aggregated boron nitrides prepared by other production methods include an aggregated boron nitride prepared by providing a reduced pressure treatment of storing the raw material boron carbide under a furnace internal pressure of less than 100 kPa during nitridating treatment or after the decarburization treatment (Patent Document 6) and an aggregated boron nitride prepared by repeated pressurization and crushing (Patent Document 7).

Alternatively, Patent Document 8 discloses surface treatment of aggregated boron nitride and Patent Document 9 discloses surface modification for improvement in filling property by surface treatment of boron nitride, for example, with a paint conditioner.

However, as described in Patent Document 1, as the hexagonal boron nitride particles are scaly in shape, when the hexagonal boron nitride powder is mixed with a resin, the particles tend to orient in the same direction. For that reason, when hexagonal boron nitride particles are mixed with a resin, the resulting resin becomes more viscous, resulting in deterioration in flowability, and it became difficult to add the particles densely in a resin.

In addition, the aggregated boron nitrides prepared in Patent Documents 2, 6, and 7 had a filling property lower than that, for example, of aluminum oxide having the same particle diameter, and thus demanded improvement in filling property into resin.

Although surface treatment of aggregated boron nitride is disclosed for example in Patent Document 8, it is a so-called integral treatment, and the surface treatment was not sufficiently effective, as the amount of the coupling agent that was actually consumed for coupling was lower than the amount of the coupling agent added.

In addition, although surface modification of boron nitride for example by a paint conditioner for improvement in filling property by surface treatment was reported in Patent Document 9, such a treatment of conventional aggregated boron nitride powder resulted in breakdown of aggregation and there was observed no improvement in filling property into resin.

Thus, in another embodiment, a main object of the present technology is to provide an aggregated boron nitride powder that is surface-treated and superior in filling property into resin, a method for producing the same, and a thermally conductive resin composition comprising the same.

After intensive studies, the inventors have made the present invention. Specifically, the inventors have conducted intensive studies for improvement in filling property into resin of the aggregated boron nitride powder. As a result, it was found that it is possible to improve the filling property into resin of aggregated boron nitride powder by using very a high-strength raw material aggregated boron nitride powder as raw material and applying a special surface treatment, which enables more effective surface treatment, to the powder. As a result, the inventors have made another embodiment of the present invention.

Another embodiment of the present invention provides an aggregated boron nitride powder having the following characteristics (A) to (D):

(A) the boron nitride aggregated grains are formed by aggregation of hexagonal h-BN primary particles;
(B) the boron nitride aggregated grains have any one or more of Si, Ti, Zr, Ce, Al, Mg, Ge, Ga, and V in an amount of 0.1 atm % or more and 3.0 atm % or less in its composition on the surface of 10 nm;
(C) the boron nitride aggregated grains have a crushing strength (at 63.2%) of 5 MPa or more; and
(D) the aggregated boron nitride powder has an average particle diameter of 20 µm or more and 100 µm or less.

The aggregated boron nitride powder may have additionally the following characteristic: (E) the boron nitride aggregated grains have organic functional groups present on the surface.

Yet another embodiment of the present invention provides a method for producing a surface-treated aggregated boron nitride powder, comprising adding an oxidizer to a raw material bulky boron particles having an average particle diameter of 20 µm or more and 100 µm or less and a crushing strength (at 63.2%) of 10 MPa or more, allowing surface modification treatment of the particles by wet-pulverization or wet-crushing, and additionally allowing reaction of the particle with a metal coupling agent.

A method for producing a surface-treated aggregated boron nitride powder in yet another embodiment of the present invention is a method wherein an oxidizer and a water-soluble solvent can be added during the surface modification treatment.

In the method for producing a surface-treated aggregated boron nitride powder described above, the metal coupling agent may be one or more agents selected from titanium coupling agents, silane coupling agents, zirconium coupling agents, and aluminum coupling agents.

Yet another embodiment of the present invention provides a method for producing a surface-modified aggregated boron nitride powder comprising adding an oxidizer to a raw material aggregated boron nitride powder having an average particle diameter of 20 µm or more and 100 µm or less and a crushing strength (at 63.2%) of 10 MPa or more, allowing surface modification treatment of the particles by wet-pulverization or wet-crushing of the mixture.

It also provides a surface-modified aggregated boron nitride powder prepared by the method for producing a surface-modified aggregated boron nitride powder described above.

It also provides a thermally conductive resin composition comprising the aggregated boron nitride powder.

The present technology provides an aggregated boron nitride powder superior in filling property into resin, a method for producing the same, and a thermally conductive resin composition comprising the same.

<2-1. Aggregated Boron Nitride Fine Powder in the Third Embodiment of the Present Invention>

The aggregated boron nitride powder in the third embodiment of the present invention has the characteristics (A) to (D) below. The aggregated boron nitride powder in the third embodiment of the present invention is superior in filling property into resin.

(A) The boron nitride aggregated grains are formed by aggregation of hexagonal h-BN primary particles;
(B) the boron nitride aggregated grains have any one or more of Si, Ti, Zr, Ce, Al, Mg, Ge, Ga, and V in an amount of 0.1 atm % or more and 3.0 atm % or less in its composition on the surface of 10 nm;
(C) The boron nitride aggregated grains have a crushing strength of 5 MPa or more; and (D) The aggregated boron nitride powder has an average particle diameter of 20 μm or more and 100 μm or less.

The aggregated boron nitride powder in the third embodiment of the present invention is characterized in that "(A) the boron nitride aggregated grains are formed by aggregation of hexagonal h-BN primary particles".

The aggregated boron nitride powder in the third embodiment of the present invention is a powder comprising boron nitride aggregated grains surface-treated with a metal coupling agent.

The surface-treated boron nitride aggregated grains can be prepared by using, as the raw material, an aggregated boron nitride powder containing boron nitride aggregated grains having a particular crushing strength that are formed by aggregation of hexagonal h-BN primary particles. The raw material boron nitride aggregated grains formed by aggregation of hexagonal h-BN primary particles can be prepared in the <(a) pressure-nitridating and calcining step> and the <(b) decarburization crystallization step> described below.

The shape of the "hexagonal h-BN primary particles" in the third embodiment of the present invention is preferably scaly.

The size, i.e., the average long side length of primary particles, of the "hexagonal h-BN primary particles" in the third embodiment of the present invention is preferably 1.5 to 3.5 μm, more preferably 1.7 to 3.2 μm, more preferably 2.0 to 3.0 μm.

When the average long side length of the primary particles is more than 3.5 μm, aggregated grains formed by aggregation of primary particles have a coarse structure internally, possibly leading to deterioration in grain strength. An average long side length of the primary particles of less than 1.5 μm may lead to deterioration in thermal conductivity, as the primary particles are smaller.

The "hexagonal h-BN primary particles" in the third embodiment of the present invention preferably have a standard deviation of the long side length of primary particles at 0.2 to 1.2 μm, more preferably 0.4 to 1.0 μm, yet more preferably 0.8 μm or less.

A standard deviation of more than 1.2 μm may give particles having an uneven structure with reduced grain strength. The minimum allowable value of the standard deviation of the long side length of primary particles is not particularly limited, but a standard deviation of less than 0.2 μm may give particles that are excessively uniform and have a dense structure, which are resistant to resin penetration and cause for example generation of voids, possibly leading to deterioration in dielectric breakdown properties.

The aggregated boron nitride powder in the third embodiment of the present invention is characterized in that "(B) the boron nitride aggregated grains have any one or more of Si, Ti, Zr, Ce, Al, Mg, Ge, Ga, and V in an amount of 0.1 atm % or more and 3.0 atm % or less in its composition on the surface of 10 nm", as described in the third embodiment of the present invention.

In "the composition on the surface of 10 nm of the boron nitride aggregated grains" in the third embodiment of the present invention, a metal element in an amount of less than 0.1 atm % may lead to insufficient improvement effect in filling property and use of a filler containing a metal element in an amount of more than 3.0 atm % may result in deterioration in thermal conductivity.

In the composition on the surface of 10 nm of the boron nitride aggregated grains in the third embodiment of the present invention, any one or more of Si, Ti, Zr, and Al is preferably present in an amount of 0.1 atm % or more and 3.0 atm % or less.

The aggregated boron nitride powder in the third embodiment of the present invention is characterized in that "(C) the boron nitride aggregated grains have a crushing strength of 5 MPa or more", as described in the third embodiment of the present invention. The "crushing strength" or the "crushing strength (at 63.2%)" is also referred to as "grain strength (at a cumulative breakdown rate of 63.2%)".

The "crushing strength of boron nitride aggregated grains" in the third embodiment of the present invention is preferably 5 MPa or more, more preferably 6 MPa or more. When the grain strength (at 63.2%) is less than 5 MPa, aggregation may be disintegrated during kneading with a resin, leading to deterioration in thermal conductivity and filling property. The maximum allowable value of the "crushing strength of boron nitride aggregated grains" in the third embodiment of the present invention is not particularly limited, and may be, for example, 30 MPa, 20 MPa, or 10 MPa.

The aggregated boron nitride powder in the third embodiment of the present invention is characterized in that "(D) the aggregated boron nitride powder has an average particle diameter of 20 μm or more and 100 μm or less", as described in the third embodiment of the present invention.

The "average particle diameter of the aggregated boron nitride powder" in the third embodiment of the present invention is preferably 20 μm or more, more preferably 22 μm or more, yet more preferably 30 μm or more. The average particle diameter of the aggregated boron nitride powder is preferably 100 μm or less, more preferably 90 μm or less, yet more preferably 80 μm or less.

An average particle diameter of less than 20 μm, which is significantly small, may lead to decrease in thermal conductivity. Alternatively when the average particle diameter is more than 100 μm, there is a smaller difference between the average particle diameter of the boron nitride powder and the thickness of the heat dissipation sheet and thus, it may become harder to produce the sheet.

In the third embodiment of the present invention, an aggregated boron nitride powder having an average boron nitride powder diameter of 20 μm or more and 100 μm or less and a crushing strength of 6 MPa or more is preferable. An aggregated boron nitride powder having an average boron nitride powder diameter of 30 μm or more and 80 μm or less is more preferable.

The aggregated boron nitride powder in the third embodiment of the present invention is further characterized in that "(E) the boron nitride aggregated grains have organic functional groups present on the surface", as described in the third embodiment of the present invention.

Examples of the organic functional groups present on the surface of the boron nitride aggregated grains include epoxy groups that may be substituted, styryl groups that may be substituted, alkyl groups that may be substituted, vinyl groups that may be substituted, acetylacetate groups that may be substituted, acyl groups that may be substituted, isocyanate groups that may be substituted, cyclohexyl groups that may be substituted, and tetraoctyl bis(ditridecyl phosphite) groups that may be substituted. The organic functional group may be a substituted or unsubstituted organic functional group. The organic functional group is one or more groups selected from these groups.

The epoxy group that may be substituted is, for example, an epoxy group.

The aryl group that may be substituted is, for example, a styryl group that may be substituted.

Examples of the alkyl groups that may be substituted include propyl groups that may be substituted (for example, methacryloxypropyl group, acryloxypropyl group, aminoethylaminopropyl group, glycidoxypropyl group, phenylaminopropyl group), and alkyl groups having a straight-chain carbon number of 5 or more (favorably, straight-chain carbon number of 5 to 25).

The vinyl group that may be substituted is, for example, a vinyl group, a styryl group, an acetylacetonate group, or a methacryloyl group.

The acetylacetonate group that may be substituted is, for example, an acetylacetonate group.

The acyl group that may be substituted is, for example, an acetylacetonate group, an isopropyl triisostearoyl group, a methacryl group, or a methacryloyl group.

The isocyanate group that may be substituted is, for example, an isocyanate group.

The cyclohexyl group that may be substituted is, for example, a cyclohexyl group.

The tetraoctyl bis(ditridecylphosphite) group that may be substituted is, for example, a tetraoctyl bis(ditridecylphosphite) group.

The organic functional group may be one or more selected from these groups.

Examples of the organic functional groups present on the surface of the aggregated boron nitride powder include epoxy groups, styryl groups, methacryloxypropyl group, an acryloxypropyl group, an aminoethylaminopropyl group, glycidoxypropyl group, a phenylaminopropyl group, acetylacetonate groups, vinyl groups, methacryl groups, methacryloyl groups, an isopropyl triisostearoyl group, an tetraoctyl bis(ditridecyl phosphite) group, cyclohexyl groups, isocyanate groups, and alkyl groups having a straight-chain carbon number of 5 or more. The organic functional group may be one or more selected from these groups.

Among the groups above, an epoxy group, a styryl group, a glycidoxypropyl group, an acetylacetonate group, a vinyl group, isopropyltriisostearoyl group, a tetraoctyl bis(ditridecyl phosphite) group, a cyclohexyl group, or an isocyanate group is more favorable.

The organic functional group may be one or more selected from these groups.

<2-2. Method for Producing a Surface-Treated Aggregated Boron Nitride Powder According to the Present Invention>

The method for producing a surface-treated aggregated boron nitride powder in the third embodiment of the present invention comprises (1) preparing an aggregated boron nitride powder containing the raw material high-strength boron nitride aggregated grains (hereinafter, also referred to as "the first aggregated boron nitride powder") and (2) allowing a special surface modification treatment of the aggregated boron nitride powder (raw material) and a metal coupling reaction of the resulting powder.

It is possible in this way to prepare the surface-treated aggregated boron nitride powder in the third embodiment of the present invention (hereinafter, also referred to as "second aggregated boron nitride powder").

<Aggregated Boron Nitride Powder (First Aggregated Boron Nitride Powder) Used as the Raw Material in the Third Embodiment of the Present Invention>

The aggregated boron nitride powder used as the raw material in the third embodiment of the present invention should be extremely high in grain strength and is preferably prepared, by the production method described below. The production method below give, for example, a boron nitride powder shown in FIGS. 1 to 3. The boron nitride powder in the first embodiment or a boron nitride powder prepared by the method for producing a boron nitride powder in the first embodiment described above can be used as the raw material.

The aggregated boron nitride powder used as the raw material in the third embodiment of the present invention can be prepared by (a) pressure-nitridating and calcining boron carbide and (b) decarburizing and crystallizing the boron carbide after calcination.

The method for producing an aggregated boron nitride powder used as the raw material in the third embodiment of the present invention comprises the following steps (a) and (b) of (a) pressure-nitridating and calcining a boron carbide having an average particle diameter of 6 μm or more and 55 μm or less, and (b) heating the boron carbide to a temperature allowing initiation of decarburization, heating it to a retention temperature at a heating rate of less than 5° C./min, and subjecting the boron carbide to a heat treatment of storing it at a temperature of 1750° C. or higher for more than 0.5 hour and less than 20 hours, in a decarburization crystallization step after pressure nitridation and calcination.

<2-2. (a) Pressure-Nitridating and Calcining Step>

In the "(a) pressure-nitridating step" in the method for producing a boron nitride powder that is used as the raw material in the third embodiment of the present invention, boron carbide having an average particle diameter of 6 μm or more and 55 μm or less is pressure-nitridated and calcined in an atmosphere at a particular calcining temperature under a particular applied pressure condition, to give a boron carbide nitride.

<2-2. (a1) Boron Carbide>

The minimum allowable value of the average particle diameter of the boron carbide is preferably 6 μm or more, more preferably 7 μm or more, yet more preferably 10 μm or more.

The maximum allowable value of the average particle diameter of the boron carbide is preferably 55 μm or less, more preferably 50 μm or less, yet more preferably 45 μm or less.

The average particle diameter of the boron carbide is preferably 7 to 50 μm, more preferably 7 to 45 μm.

The boron carbide preferably has a carbon content of 18.0% to 20.5%.

Any production method may be used as the method for producing the boron carbide and gives a boron carbide having a desired average particle diameter and a carbon content.

It is possible to obtain boron carbide lumps, for example, by mixing boric acid and acetylene black and heating the mixture in an atmosphere at 1800 to 2400° C. for 1 to 10 hours. The lumps may, for example, be pulverized, sieved, washed, purified, and dried, as needed, to give a boron carbide powder.

Boric acid and acetylene black, raw materials of boron carbide, are favorably mixed at a ratio of 25 to 40 parts by mass of acetylene black to 100 parts by mass of boric acid.

The atmosphere in which the boron carbide is produced is preferably an inert gas, and examples of the inert gases include argon gas and nitrogen gas. These gases may be used alone or in combination. In particular, argon gas is preferable.

A common pulverizer or crusher can be used for pulverization of the boron carbide lumps and the lumps are pulverized, for example, for 0.5 to 3 hours.

The boron carbide after pulverization is preferably sieved with a sieve screen into particles having a particle diameter of 75 μm or less.

<2-2. (a2) Pressure-Nitridating and Calcining Step>

The minimum allowable value of the calcining temperature in the pressure-nitridating step is preferably 1700° C. or higher, more preferably 1800° C. or higher. The maximum allowable value of the calcining temperature is preferably 2400° C. or lower, more preferably 2200° C. or lower. The calcining temperature is more preferably 1800 to 2200° C.

The minimum allowable value of the pressure in the pressure-nitridating step is preferably 0.6 MPa or more, more preferably 0.7 MPa or more. The maximum allowable value of the pressure is preferably 1.0 MPa or less, more preferably 0.9 MPa or less. The pressure is more preferably 0.7 to 1.0 MPa.

The calcining temperature and the pressure condition in the pressure-nitridating step are preferably a calcining temperature of 1800° C. or higher and a pressure of 0.7 to 1.0 MPa.

It is because nitridation of boron carbide does not proceed sufficiently when the calcining temperature is 1800° C. and the pressure is less than 0.7 MPa. It is also desirable industrially to produce the boron carbide nitride at a pressure of 1.0 MPa or less.

The atmosphere in the pressure-nitridating step is desirably a gas permitting the nitridation reaction and examples thereof include nitrogen gas and ammonia gas. These gases may be used alone or in combination of two or more. In particular, nitrogen gas is most desirable for nitridization from the point of production cost. The atmosphere preferably contains nitrogen gas at least in an amount of 95% (V/V) or more, more preferably 99.9% or more.

The calcination period in the pressure-nitridating step is preferably 6 to 30 hours, more preferably 8 to 20 hours.

<2-2. (b) Decarburization Crystallization Step>

In the "(b) decarburization crystallization step" of the method for producing a boron nitride powder that is used as the raw material in the third embodiment of the present invention, it is possible to prepare boron nitride aggregated grains that are formed by aggregation of primary particles (primary particles of scaly hexagonal boron nitride) by subjecting the boron carbide nitride prepared in the pressure-nitridating step to an heat treatment of heating it to a retention temperature at a particular heating rate under an atmosphere at normal pressure or higher and heating it at a particular temperature range for a certain period of time.

In the decarburization crystallization step, the boron carbide nitride prepared from boron carbide, as described above, is decarburized, grown and aggregated to scaly grains having a particular size, to give aggregated boron nitride grains.

Preferably in the decarburization crystallization step, the boron carbide nitride is subjected to a heat treatment of heating it to a temperature allowing initiation of decarburization in an atmosphere at normal pressure or higher, heating it to a retention temperature at a heating rate of less than 5° C./min, and heating it at a temperature of 1750° C. or higher for more than 0.5 hour and less than 20 hours.

More preferably in the decarburization crystallization step, the boron carbide nitride is subjected to a heat treatment of heating it to a temperature allowing initiation of decarburization in an atmosphere at normal pressure or higher, heating it to a retention temperature at a heating rate of less than 5° C./min and heating it at a temperature of 1800° C. or higher for 1 hour or more and 20 hours or less.

Desirably in the decarburization crystallization step, the boron carbide nitride prepared in the pressure-nitridating step and boric acid and/or boron oxide (with other raw materials, as needed) are mixed as the raw materials in the step, and the mixture is decarburized and crystallized.

The mixing rate of the boron carbide nitride with boric acid and/or boron oxide is preferably 100 to 300 parts by mass of boric acid-boron oxide, more preferably 150 to 250 parts by mass of boric acid-boron oxide, with respect to 100 parts by mass of the boron carbide nitride.

The pressure condition of the "atmosphere at normal pressure or higher" in the decarburization crystallization step is preferably normal pressure or higher, more preferably 0.1 MPa or higher, more preferably 0.2 MPa or higher. The maximum allowable value of the pressure condition of the atmosphere is not particularly limited, but preferably 1 MPa or less, more preferably 0.5 MPa or less. The pressure condition is preferably 0.2 to 0.4 MPa.

The "atmosphere" in the decarburization crystallization step is preferably nitrogen gas and nitrogen gas is preferably contained in the atmosphere in an amount of 90% (V/V) or more, and more preferably, high purity nitrogen gas (99.9% or more) is used.

The "heating" in the decarburization crystallization step may be performed in one step or in multiple steps. Multi-step heating is desirably selected for reduction of the time needed for heating to a temperature allowing initiation of decarburization.

In the "first-step heating" of the multi-step heating the boron carbide nitride mixture is preferably heated to a "temperature allowing initiation of decarburization".

The "temperature allowing initiation of decarburization" is not particularly limited and may be any temperature normally employed, and it may be, for example, approximately 800 to 1200° C. (favorably, approximately 1000° C.).

The "first-step heating" may be carried out, for example, at a heating rate in the range of 5 to 20° C./min, favorably 8 to 12° C./min.

A second-step heating is preferably carried out after the first-step heating. The "second-step heating" is more preferably carried out by "heating the boron carbide nitride mixture to a desired retention temperature".

The maximum allowable value of the "second-step heating rate" is preferably less than 5° C./min, more preferably 4° C./min or less, yet more preferably 3° C. or lower, even more preferably 2° C. or lower. A lower heating rate is preferable for more uniform growth of the grains.

The minimum allowable value of the "second-step heating rate" is preferably 0.1° C./min or more, more preferably 0.5° C./min or more, yet more preferably 1° C./min or more. A "second-step heating rate" of 1° C. or higher is preferable from the point of production cost, as it permits reduction in production period.

The "second-step heating rate" is favorably 0.1 to 5° C./min. A second-step heating rate of more than 5° C./min leads to heterogeneous growth of grains and thus production of heterogeneously structured grains, possibly leading to deterioration in grain strength.

The minimum allowable value of the "particular temperature range (retention temperature after heating)" is preferably 1750° C. or higher, more preferably 1800° C. or higher, yet more preferably 2000° C. or higher. The maximum allowable value of the "retention temperature" is preferably 2200° C. or lower, more preferably 2100° C. or lower.

A retention temperature after heating of less than 1750° C. leads to insufficient growth of grains, possibly leading to deterioration in thermal conductivity. A retention temperature of 1800° C. or higher easily leads to favorable growth of grains and thus to improvement in thermal conductivity.

The "retention period (at the retention temperature after heating)" is preferably more than 0.5 hour and less than 20 hours.

The "retention period" is preferably 1 hour or more, more preferably 3 hours or more, yet more preferably 5 hours or more, even more preferably 10 hours or more.

The maximum allowable value of the "retention period" is preferably 20 hours or less, more preferably 15 hours or less.

The retention period is desirably 1 to 20 hours.

When the retention period after heating is 1 hour or more, the grains grow favorably, and when it is 20 hours or less, the grains grow favorably without deterioration in grain strength due to excessive growth of grains and such a retention period is also favorable for preventing industrial disadvantage caused by extended calcination period.

The boron nitride powder according to the present invention can be prepared after the pressure-nitridating and calcining step (a) and the decarburization crystallization step (b).

For reduction of the weak aggregation among aggregated grains, the boron nitride aggregated grains prepared in the decarburization crystallization step is desirably pulverized or crushed and additionally classified.

Means for pulverization and crushing are not particularly limited, and any common pulverizer or crusher may be used. A common sieving method that gives grains having an average particle diameter of 20 μm or more and 100 μm or less may be used for classification. For example, the aggregated grains are pulverized in a Henschel Mixer or a mortar and then classified on a vibration sieving machine.

The average particle diameter of "the first aggregated boron nitride powder" in the third embodiment of the present invention is preferably 20 μm or more, more preferably 22 μm or more, yet more preferably 30 μm or more. The average particle diameter of the boron nitride powder is preferably 100 μm or less, more preferably 90 μm or less, yet more preferably 80 μm or less.

The average particle diameter of "the first boron nitride powder" is preferably 20 μm or more and 100 μm or less, more preferably 30 μm or more and 80 μm or less.

An average particle diameter of less than 20 μm may lead to deterioration in thermal conductivity, as the average particle diameter is excessively small. When the average particle diameter is more than 100 μm, there is a smaller difference between the average particle diameter of the boron nitride powder and the thickness of the heat dissipation sheet, possibly making it difficult to prepare the sheet.

The grain strength (at a cumulative breakdown rate of 63.2%) of "the first aggregated boron nitride powder" used in the third embodiment of the present invention is preferably 9 MPa or more, more preferably 10 MPa or more, yet more preferably 15 MPa or more, even more preferably 20 MPa or more.

When the grain strength is less than 9 MPa, the aggregation may be disintegrated during kneading with a resin, leading to deterioration in thermal conductivity and filling property.

The maximum allowable value of the grain strength (at a cumulative breakdown rate of 63.2%) of "the first aggregated boron nitride powder" is not particularly limited, but may be, for example, 50 MPa, 40 MPa or 30 MPa.

The grain strength (at a cumulative breakdown rate of 20.0%) of "the first aggregated boron nitride powder" used as the raw material in the third embodiment of the present invention is more preferably 4.5 MPa or more, more preferably 5.0 MPa or more. The maximum allowable value of grain strength (at a cumulative breakdown rate of 20.0%) of "the first aggregated boron nitride powder" is not particularly limited, but may be, for example, 20 MPa or 13 MPa.

The "average long side length of the primary particles" and the "standard deviation of the long side lengths of the primary particles" in the "scaly hexagonal boron nitride (primary particles)" of the "first aggregated boron nitride powder" used as the raw material in the third embodiment of the present invention are those for the "hexagonal boron nitride h-BN primary particles" described above.

<Surface-Treated Aggregated Boron Nitride Powder in the Third Embodiment of the Present Invention (Second Aggregated Boron Nitride Powder)>

The surface treatment method used in the third embodiment of the present invention preferably comprises steps of (c) adding an oxidizer to the first aggregated boron nitride powder (raw material) and surface-modifying the particles while wet, and additionally (d) subjecting the powder after the surface modification treatment to a reaction with a metal coupling agent. It is thus possible to prepare a surface-treated aggregated boron nitride powder (second aggregated boron nitride powder).

The raw material to be surface-treated is desirably an aggregated boron nitride powder (first aggregated boron nitride powder) having an average particle diameter of 20 μm or more and 100 μm or less and a crushing strength (grain strength (at a cumulative breakdown rate of 63.2%)) of 10 MPa or more.

When the crushing strength (at 63.2%) of the raw material is less than 10 MPa, the aggregated grains may be disintegrated during the surface modification treatment in a pulverizer or crusher, prohibiting preservation of the aggregation structure. As a result, it may result in deterioration in thermal conductivity and filling property.

During the surface modification treatment, the particles are preferably subjected to surface modification treatment while wet in a pulverizer or crusher, as an oxidizer is added thereto.

In the metal coupling reaction, it is desirable to make the surface-treated powder react with a metal coupling agent containing, for example, a metal alkoxide, a metal chelate, or a metal halide.

<2-2. (c) Surface Modification Treatment Step>

The surface treatment method used in the third embodiment of the present invention preferably comprises a step of adding an oxidizer to the "first aggregated boron nitride powder" and subjecting the mixture to a particle surface modification treatment while wet.

Combined use of an oxidizer in the pulverization-crushing treatment permits efficient modification of the particle surface and efficient progress of the coupling reaction, as it improves dispersibility and increases the number of surface functional groups. It is thus possible to prepare surface-modified boron nitride aggregated grains before treatment with a metal coupling agent. The state of the surface-modified particles is not particularly limited and may be a slurry or a powder.

The oxidizer used is not particularly limited, and examples thereof include hydrogen peroxides, nitric acids, and permanganic acid salts. Among the oxidizers above, those soluble in solvent and easily removable after treatment are desirable. More desirable are hydrogen peroxides, compounds that have an oxidative force not lower than hydrogen peroxide and are soluble in solvent and easily removable after treatment (e.g., nitric acids) and the like. These oxidizers may be used alone or in combination of two or more. Only water is desirably used as the solvent, depending on the oxidizer selected.

Combined use of the pulverization-crushing treatment and an oxidizer results in more efficiently surface modification, improvement in dispersibility, increase in the number of surface functional groups and efficient progress of the coupling reaction.

The amount of the oxidizer used is preferably 30 to 200 parts, more preferably 50 to 150 parts, with respect to 100 parts of boron nitride.

The solvent to be mixed with the oxidizer is preferably a water-soluble solvent. The water-soluble solvents are, for example, one or more solvents selected from water, alcohols, and dioxanes. Use of water and/or an alcohol is preferable. The alcohol is preferably an alcohol having a straight-chain or branched-chain alkyl group, and those having an alkyl group of 1 to 3 carbon atoms (e.g., methanol, ethanol, propyl alcohol, isopropyl alcohol) are preferable. More preferable are water, an alcohol having 1 to 3 carbon atoms, and the mixture thereof.

The blending ratio of the oxidizer to the solvent is preferably 1 to 10 parts, more preferably 2 to 7 parts, with respect to 100 parts of the solvent.

A known wet-processable pulverizer or crusher may be used for wet-pulverization or wet-crushing in the third embodiment of the present invention.

The pulverizer or crusher is not particularly limited and may be any mill that permits surface modification treatment while wet such as a rocking mill, a bead mill, a ball mill, a Henschel Mixer, a jet mill, a star-burst mill, or paint conditioner.

The treatment period in the pulverizer or crusher is desirably 10 minutes or more and 5 hours or less. A treatment period of less than 10 minutes may lead to insufficient surface modification efficiency of the pulverization or crushing and a treatment period of more than 5 hours is also unfavorable, as it leads to deterioration in productivity and also in grain strength.

<2-2. (d) Step of Introducing Metal Elements and Organic Functional Groups>

The surface treatment method used in the third embodiment of the present invention preferably comprises a "step (d) of making the surface of the boron nitride aggregated grains subjected to the special surface modification treatment react with a metal coupling agent having organic functional groups".

It is thus possible to obtain an aggregated boron nitride powder in the third embodiment of the present invention (also referred to as "second aggregated boron nitride powder" or "surface-treated aggregated boron nitride powder") that have metal elements and organic functional groups present on the particle surface of the boron nitride powder.

The aggregated boron nitride powder in the third embodiment of the present invention contains the surface-treated boron nitride aggregated grains.

It is desirable, before the metal coupling reaction, to filter and wash the slurry obtained by sieving the boron nitride particles after particle surface modification treatment. The washing liquid is not particularly limited and, for example, a solvent that is miscible with oxidizer may be used.

The temperature of the coupling reaction condition is preferably 10 to 70° C., more preferably 20 to 70° C.

The period of the coupling reaction condition is preferably 0.2 to 5 hours, more preferably 0.5 to 3 hours.

The solvent for the metal coupling reaction is not particularly limited and examples thereof include alcohols (favorably, straight- or branched-chain alcohols having 1 to 5 carbon atoms), acetone, and furan. Among the solvents above, methanol, ethanol, propyl alcohol, isopropyl alcohol, and acetone are preferable. These solvents may be used alone or in combination of two or more.

The amount of the solvent used for the metal coupling reaction is preferably 100 to 2000 parts, more preferably 600 to 1200 parts, with respect to 100 parts of boron nitride.

The amount of the metal coupling agent used is not particularly limited and preferably 0.5 to 10 parts, more preferably 1 to 5 parts, with respect to 100 parts of boron nitride.

In the present invention, the metal coupling agent is not particularly limited. As shown in [Examples] below, it was possible to bind an metal element and organic functional groups onto the surface of the boron nitride aggregated grains using various metal coupling agents and thus in the present invention, a desired metal coupling agent may be used as properly selected.

It is preferable to select a coupling agent that is suited for the resin used. It is possible in this way to obtain an aggregated boron nitride powder that is favorably compatible with the resin used in the thermally conductive resin composition.

Examples of the metal coupling agents used in the third embodiment of the present invention include, but are not limited to, metal coupling agents, such as metal alkoxides, metal chelates, and metal halides, containing Si, Ti, Zr, or Al and a coupling agent suitable for the resin used is preferably selected.

If the metal coupling agent contains a straight-chain alkyl group for introduction, the alkyl group preferably has a carbon number of 5 or more.

The coupling agent is preferably added in such an amount that the aggregated boron nitride powder according to the present invention contains any one of Si, Ti, Zr and Al in an amount of 0.1 atm % or more and 3.0 atm % or less, as determined by X-Ray photoelectron spectroscopy analysis, in its composition on the surface of 10 nm. When the treatment amount is less than 0.1 atm %, there may be insufficient improvement effect in filling property, and when it is more than 3.0 atm %, it may result in deterioration in the thermal conductivity when the powder is used as a filler.

Examples of the titanium coupling agents include isopropyl triisostearoyl titanate, isopropyl tridodecylbenzenesulfonyl titanate, isopropyl tris(dioctylpyrophosphate) titanate, tetraisopropyl bis(dioctyl phosphite) titanate, tetraoctyl bis(ditridecylphosphite) titanate, tetra(2,2-diallyloxymethyl) bis(ditridecyl)phosphite titanate, bis(dioctylpyrophosphate) oxyacetate titanate, bis(dioctylpyrophosphate) ethylene titanate, isopropyl trioctanoyl titanate, isopropyl dimethacryl isostearoyl titanate, isopropyl isostearoyl diacryl titanate, isopropyl tri(dioctylphosphate) titanate, isopropyl tricumylphenyl titanate, isopropyl tri(N-aminoethyl-aminoethyl) titanate, dicumylphenyloxyacetate titanate, and diisostearoyl ethylene titanate.

Preferable among the compounds above are isopropyl triisostearoyl titanate (metal alkoxide), tetraisopropyl bis(dioctylphosphite) titanate (metal chelate), and tetraoctyl bis(ditridecylphosphite) titanate (metal chelate).

Examples of the silane coupling agents include vinylsilanes such as vinyl trichlorosilane, vinyl tris(β-methoxyethoxy)silane, vinyl triethoxysilane, and vinyltrimethoxysilane; γ-methacryloxypropyltrimethoxysilane; epoxysilanes such as β-(3,4-epoxycyclohexyl)ethyltrimethoxysilane, 3-glycidoxypropyltrimethoxysilane, and 3-glycidoxypropylmethyl diethoxysilane; and aminosilanes such as N-β-

(aminoethyl)-γ-aminopropyltrimethoxysilane, N-β-(aminoethyl)-γ-aminopropylmethyldimethoxysilane, γ-aminopropyltrimethoxysilane, and N-phenyl-γ-aminopropyltrimethoxysilane. Other silane coupling agents include γ-mercaptopropyltrimethoxysilane, γ-chloropropylmethyldimethoxysilane, γ-chloropropylmethyl diethoxysilane, and the like.

Preferable among them are 3-glycidyloxypropyltrimethoxysilane, p-styryltrimethoxysilane (metal alkoxide), 3-isocyanatopropyltriethoxysilane (metal alkoxide), vinyltrimethoxysilane (metal alkoxide), and cyclohexylmethyldimethoxysilane (metal alkoxide).

Examples of the zirconium coupling agents include tetra-n-propoxyzirconium, tetra-butoxyzirconium, zirconium tetraacetylacetonate, zirconium dibutoxybis(acetylacetonate), zirconium tributoxyethylacetoacetate, zirconium butoxyacetylacetonate bis(ethyl acetoacetate), and tetrakis(2,4-pentanedionato)zirconium.

Preferable among them are tetrakis(2,4-pentanedionato) zirconium (metal alkoxide).

Examples of the aluminum coupling agents include aluminum isopropylate, mono-sec-butoxyaluminum diisopropylate, aluminum sec-butyrate, aluminum ethylate, ethyl acetoacetate aluminum diisopropylate, aluminum tris(ethyl acetoacetate), alkyl acetoacetate aluminum diisopropylate, aluminum monoacetylacetonate bis(ethyl acetoacetate), aluminum tris(acetyl acetoacetate), and aluminum bisethyl acetoacetate monoacetylacetonate.

Preferable among them is aluminum bisethyl acetoacetate-monoacetylacetonate (metal chelate compound).

The aggregated boron nitride powder according to the present invention (second aggregated boron nitride powder) prepared by the method for producing a boron nitride powder in the third embodiment of the present invention is characterized in a similar manner to <2-1. The aggregated boron nitride fine powder in the third embodiment of the present invention> described above.

<2-3. Thermally Conductive Resin Composition>

The thermally conductive resin composition in the fourth embodiment of the present invention is characterized by containing the aggregated boron nitride powder in the third embodiment of the present invention or an aggregated boron nitride powder prepared by the production method in the third embodiment of the present invention described above. A known production method may be used as the method for producing the thermally conductive resin composition. The thermally conductive resin composition prepared can be used widely, for example as a heat-dissipating part.

It is preferable to use an aggregated boron nitride powder in the third embodiment of the present invention that is higher in compatibility with the resin used as the raw material. As the aggregated boron nitride powder in the third embodiment of the present invention has organic functional groups present on the particle surface, it is preferable to select and produce a favorable aggregated boron nitride powder, as the compatibility between the organic functional groups and the raw material resin is taken into consideration.

The aggregated boron nitride powder in the third embodiment of the present invention can, as it suppresses increase in viscosity when the thermally conductive resin composition is prepared, be applicable to a high-viscosity raw material resin. As described above, the aggregated boron nitride powder in the third embodiment of the present invention can be applicable to a wide variety of raw material resins.

The boron nitride powder in the first embodiment described above may be used in a thermally conductive resin composition, as it is blended with the boron nitride powder in the third embodiment of the present invention in the range that does not impair the advantageous effects of the present invention. The boron nitride powder according to the present invention can also be used as an inorganic filler in thermally conductive resin compositions.

<Resin>

Examples of the resins used in the thermally conductive resin composition containing the aggregated boron nitride powder in the third embodiment of the present invention include epoxy resins, silicone resins, silicone rubbers, acrylic resins, phenol resins, melamine resins, urea resins, unsaturated polyesters, fluoroplastics, polyamides (for example, polyimides, polyamide-imides, polyether imides), polyesters (for example, polybutylene terephthalate, polyethylene terephthalate), polyphenylene ethers, polyphenylene sulfides, wholly aromatic polyesters, polysulfones, liquid crystalline polymers, polyether sulfones, polycarbonates, maleimide-modified resins, ABS resins, AAS (acrylonitrile-acrylic rubber-styrene) resins, and AES (acrylonitrile-ethylene-propylene-diene rubber-styrene) resins.

In particular, epoxy resins (favorably, bisphenol A-type epoxy resins, naphthalene-type epoxy resins, etc.), which are superior in heat resistance and adhesive strength to copper foil circuits, are favorable as an insulation layer for printed wiring boards.

Silicone resins, which are superior in heat resistance, flexibility, and adhesiveness for example to heat sink, are favorable as a thermal interface material.

Typical examples of the epoxy resin hardeners include phenolic novolak resins, acid anhydride resins, amino resins, and imidazoles. Among the resins above, imidazoles are preferable.

The amount of the hardener blended is preferably 0.5 part by mass or more and 15 parts by mass or less, more preferably 1.0 part by mass or more and 10 parts by mass or less.

The amount of the aggregated boron nitride powder used in 100 vol % of the thermally conductive resin composition is preferably 30 vol % or more and 85 vol % or less, more preferably 40 vol % or more and 80 vol % or less, with respect to the total amount of epoxy resin and hardener.

When the amount of the aggregated boron nitride powder used is 30 vol % or more, the thermally conductive resin composition has improved thermal conductivity and easily shows sufficiently high heat dissipating performance. When the content of the aggregated boron nitride powder is 85 vol % or less, it is possible to reduce void generation during molding and thus to reduce deterioration in insulating efficiency and mechanical strength of the molded product.

The surface-treated aggregated boron nitride powder in another embodiment of the present invention can be used widely, for example as a heat-dissipating part.

Various test methods employed include the followings:

(1) Average Particle Diameter

A laser diffraction/scattering particle size distribution analyzer (LS-13 320) manufactured by Beckmann Coulter was used for measurement of the average particle diameter. The average particle diameter obtained without pretreatment in a homogenizer before measurement was used as the average particle diameter. The average particle diameter obtained is a volume-based average particle diameter.

(2) Grain Strength

Grain strength was determined according to JIS R1639-5. The analyzer used was a micro-compression testing machine ("MCT-W500", manufactured by Shimadzu Corporation). The grain strength ($\sigma$:MPa) was determined from a dimensionless number that changes according to the position in the grain ($\alpha=2.48$: –), a crushing test force (P:N), and a particle diameter (d:μm) according to the following formula: $\sigma=\alpha \times D/(\pi \times d2)$. Twenty or more particles were analyzed and the values at cumulative breakdown rates of 20% and/or 63.2% were determined. The value at a cumulative breakdown rate of 63.2% was used as the grain strength (crushing strength) in Tables 3 and 4.

(3) Diameter of Primary Particles

As pretreatment for observation of the boron nitride aggregated grains, the boron nitride particle prepared was embedded in an epoxy resin and the mixture was processed by the CP (cross-section polisher) method. The sample thus obtained was fixed on the test piece stage and subjected to osmium coating.

The cross section of the sample was observed under a scanning electron microscope (e.g., "JSM-6010LA" (manufactured by JEOL)) at an observation magnification of 2000 to 5000 times. The crosssectional particle image obtained was sent to an image analysis software, for example "Macview", for determination of the long side length. The long side lengths of 100 pieces of crosssectional particles arbitrarily chosen were determined and the average thereof was used as the average long side length. The standard deviation of the long side length was also determined. FIG. 3 shows an SEM image of Example 1.

(4) Thermal Conductivity

Thermal conductivity (H; W/(m·K)) was determined from thermal diffusivity (A:m$^2$/sec), specific density (B:kg/m$^3$), and specific heat capacity (C:J/(kg·K)) according to the formula: $H=A \times B \times C$.

The thermal diffusivity was determined by the laser flash method, as a sheet of 10 mm×10 mm (width)×0.5 mm (thickness) was prepared as the test sample. The analyzer used was a xenon flash analyzer ("LFA447NanoFlash" manufactured by NETZSCH). The specific density was determined by the Archimedes method. The specific heat capacity was determined on a DSC ("ThermoPlus Evo DSC8230" manufactured by Rigaku Corporation)

A thermal conductivity of 10 W/mK or more was considered satisfactory in the present invention.

(5) Residual Rate of BN Aggregated Grains

BN aggregated grains residual rate was determined for evaluation of the properties in grain strength when the boron nitride powder obtained is mixed with a resin. A boron nitride powder was mixed, in an amount of 10 vol %, with an epoxy resin ("Epikote 807" produced by Mitsubishi Chemical Corporation) and a hardener ("Akumex H-84B", produced by Nihon Gosei Kako).

The mixture was processed in a three-roll mill "M-50" manufactured by Nagase Screen Printing at a gap distance of 100 μm, applied then on a PET sheet to a thickness of 1.0 mm and defoamed at a reduced pressure of 500 Pa for 10 minutes. The applied mixture was then subjected to press-heating pressurization under a condition of a temperature of 150° C. and a pressure of 160 kg/cm$^2$ for 60 minutes, to give a sheet having a thickness of 0.5 mm.

The sheet was subjected to a crosssectional observation similar to that used for determination of primary particle size above to determine the number of aggregate particles present in 20 visual field observed at a magnification of 200 to 1000 times. Sheets without processing in the three-roll mill were also similarly analyzed for determination of the number of aggregated grains. Those having an aggregated grain residual rate of 80% or more was considered satisfactory and indicated by 0 in the table and those having a residual rate of 80% or less were considered unsatisfactory and indicated by x.

(6) Carbon Content

Carbon content was determined on a simultaneous carbon/sulfur analyzer "CS-444LS" (manufactured by LECO).

(7) Viscosity

In preparing the sample for viscosity measurement, boron nitride powder was added to 100 parts of a naphthalene-type epoxy resin (HP4032 produced by DIC) and 10 parts of a hardener imidazole (2E4 MZ-CN, produced by Shikoku Corporation) and the mixture was kneaded in a planetary centrifugal mixer (ARV-310 manufactured by Thinky Corporation). Samples were prepared at a boron nitride powder loading rate of 25 vol % and the viscosities of the samples were compared in a low-shear rate region. The viscosity was determined on a rheometer MCR300 manufactured by Anton-Paar at a shear rate of 0.11/sec and the value was used as the evaluation value. Filling property may be considered higher when the viscosity is lower and a viscosity of 50·Pa·sec or less was considered satisfactory.

(8) X-Ray Photoelectron Spectroscopy Analysis:

The amount of metals present on the surface of boron nitride was determined by analyzing treated powder on K-Alpha X-Ray photoelectron spectrometer manufactured by Thermo Fisher under the conditions of an excitation source of Al—X-ray with monochrometer and a measurement region of 400×200 μm. Semi-quantitative values of detected metal elements were estimated from the integral values of the detected elements B, N, C, O, and respective metals. The values are normally represented by atom number rate (atm %). The X-Ray photoelectron spectrometer had a detection depth of 10 nm from the surface.

(9) Time-of-Flight Secondary Ion Mass Spectrometry (TOF-SIMS):

Functional groups on the surface of boron nitride were analyzed on a time-of-flight secondary ion mass spectrometer PHI nanoTOF II manufactured by ULVAC-PHI, Inc. When the results of mass spectrometry indicate detection of multiple fragment peaks derived from the coupling agent, ○ is shown in the column of Surface functional group and x is shown there when the results show no detection of the fragment peaks.

EXAMPLES

Hereinafter, the present invention will be described more in detail with reference to Examples, Test Examples, and Comparative Examples. It should be understood that the present invention is not limited to the Examples described below.

Example 1

In Example 1, a boron nitride powder was prepared in the steps of preparing boron carbide, nitridating it under pressure and decarburizing and crystallizing the product, as described below.

(Preparation of Boron Carbide)

100 parts of orthoboric acid (hereinafter, boric acid) produced by Nihon Denko and 35 parts of acetylene black (HS100) produced by Denka Co., Ltd. were mixed in a Henschel Mixer and the mixture was placed in a graphite crucible and calcined in an arc furnace under an argon atmosphere at 2200° C. for 5 hours, to give a boron carbide ($B_4C$). The boron carbide lumps prepared was pulverized in a ball mill for 1 hour and sieved with a sieve screen into particles having a particle diameter of 75 μm or less. The particles were washed with aqueous nitric acid solution for removal of impurities such as iron, and filtered and dried, to give a boron carbide powder having an average particle diameter of 20 μm. The boron carbide powder obtained had a carbon content of 20.0%.
(Pressure-Nitridating Step)

The boron carbide prepared was placed in a boron nitride crucible and incinerated in a resistance-heating furnace under a condition of a nitrogen gas atmosphere at 2000° C. and a pressure of 9 atmospheric pressure (0.8 MPa) for 10 hours, to give a boron carbide nitride ($B_4CN_4$).
(Decarburization Crystallization Step)

100 parts of the boron carbide nitride prepared and 200 parts of boric acid were mixed in a Henschel Mixer. The mixture was placed in a boron nitride crucible and heated from room temperature to 1000° C. at a heating rate of 10° C./min and from 1000° C. upward at a heating rate of 2° C./min in a resistance-heating furnace under a nitrogen gas atmosphere and heated at a retention temperature of 2000° C. for a retention period of 10 hours under the condition of a pressure of 0.3 MPa, to give bulky boron nitride aggregated grains in which primary particles are aggregated.

The boron nitride aggregated grains prepared was pulverized in a mortar for 10 minutes and classified with a sieve screen and with a nylon sieve having a sieve opening of 75 μm.

Pulverization and classification of the incinerated product gave a boron nitride powder containing bulky boron nitride aggregated grains in which primary particles are aggregated (hereinafter, also referred to as "aggregated boron nitride powder").

The boron nitride aggregated grains prepared had a carbon content of 0.08%.
(Mixing with Resin)

For evaluation of the properties of the boron nitride powder obtained as a filler for resins, 100 parts of a naphthalene-type epoxy resin (HP4032, produced by DIC) and 10 parts of a hardener imidazole (2E4 MZ-CN produced by Shikoku Corporation) were mixed with the boron nitride powder content of 50 vol % and the mixture was applied on a PET sheet to a thickness of 1.0 mm and defoamed at a reduced pressure of 500 Pa for 10 minutes. The coated sheet was then heated and pressurized under the condition at a temperature of 150° C. and a pressure of 160 kg/cm² for 60 minutes, to give a sheet of 0.5 mm.

The case when the slurry after mixing was less flowable and cannot be casted was indicated in the table by "unfavorable filling property".

Example 2

In Example 2, an aggregated boron nitride powder was prepared under a condition similar to that in Example 1, except that "a boron carbide having an average particle diameter of 8 μm (carbon content: 20.1%)" was prepared, as the pulverization period was elongated to 2 hours and a sieve screen having an opening of 45 μm was used when boron carbide was prepared.

Example 3

In Example 3, an aggregated boron nitride powder was prepared under a condition similar to that in Example 1, except that: a "boron carbide having an average particle diameter of 40 μm (carbon content: 19.2%)" was prepared, as pulverization was carried out for 0.5 hour during preparation of boron carbide and a sieve screen having an opening of 150 μm was used; and the sieve used after the decarburization crystallization step was changed to that having an opening of 150 μm.

Example 4

In Example 4, an aggregated boron nitride powder was prepared under a condition similar to that in Example 1, except that the heating rate in the decarburization crystallization step was changed to 5° C./min.

Example 5

In Example 5, an aggregated boron nitride powder was prepared under a condition similar to that in Example 1, except that the retention period in the decarburization crystallization step was changed to 20 hours.

Example 6

In Example 6, an aggregated boron nitride powder was prepared under a condition similar to that in Example 1, except that the retention temperature in the decarburization crystallization step was changed to 1800° C.

Example 7

In Example 7, an aggregated boron nitride powder was prepared under a condition similar to that in Example 1, except that the heating rate from 1000° C. in the decarburization crystallization step was changed to 0.5° C./min.

Comparative Example 1

In Comparative Example 1, an aggregated boron nitride powder was prepared under a condition similar to that in Example 1, except that the heating rate from 1000° C. in the decarburization crystallization step was changed to 10° C./min.

Comparative Example 2

In Comparative Example 2, an aggregated boron nitride powder was prepared under a condition similar to that in Example 1, except that a boron carbide having an average particle diameter of 5 μm (carbon content: 20.3%)" was prepared, as the pulverization period during boron carbide preparation was changed to 10 hours and a sieve screen having an opening of 45 μm was used.

Comparative Example 3

In Comparative Example 3, an aggregated boron nitride powder was prepared under a condition similar to that in Example 1, except that: a boron carbide having an average particle diameter of 60 μm (carbon content: 20.4%) was prepared, as the pulverization period during the boron carbide preparation was changed to 0.2 hour and a sieve screen having an opening of 250 μm was used; and a sieve having an opening of 250 μm was used after the decarburization crystallization step.

Comparative Example 4

In Comparative Example 4, an aggregated boron nitride powder was prepared under a condition similar to that in Example 1, except that the retention period in the decarburization crystallization step was changed to 40 hours.

Comparative Example 5

In Comparative Example 5, an aggregated boron nitride powder was prepared under a condition similar to that in Example 1, except that the retention temperature in the decarburization crystallization step was changed to 1700° C.

Comparative Example 6

In Comparative Example 6, an aggregated boron nitride powder was prepared under a condition similar to that in Example 1, except that a boron carbide having a carbon content of 21.7% (average particle diameter: 20 μm) was prepared, as 45 parts of acetylene black was used in preparation of the boron carbide.

Comparative Examples 7 and 8

Two kinds of commercially available boron nitride powders (commercial products A and B) were evaluated similarly to Examples 1 to 7 and Comparative Examples 1 to 6. Results obtained from the commercial product A are summarized as results of Comparative Example 7 and those obtained from the commercial product B as the results of Comparative Example 8.

The results shown in Tables 1 and 2 indicate the followings:

<Average Particle Diameter>

As shown in Examples 1 to 7 (see for example Examples 2 and 3), boron nitride powders having an average particle diameter of 22 to 80 gave a favorable thermal conductivity and a favorable residual rate of BN aggregated grains. In contrast as shown in Comparative Example 2, the boron nitride powder is not favorable when it has an average particle diameter of 10 μm or less and, as shown in Comparative Example 3, the boron nitride powder was also unfavorable when it has an average particle diameter of 110 μm or more.

<Grain Strength (at 63.2%)>

As shown in Examples 1 to 7 (e.g., see Example 4), a grain strength (at 63.2%) of 8.0 MPa or more leads to favorable thermal conductivity and BN aggregated grain residual rate. In contrast as shown in Comparative Examples 1, 4, 6 to 8, a grain strength (at 63.2%) of 6 MPa or less gave unfavorable results.

<Grain Strength (at 20.0%)>

As shown in Examples 1 to 7 (see in particular Example 4), a grain strength (at 20.0%) of 4.6 MPa or more gave favorable thermal conductivity and BN aggregated grain residual rate. In contrast as shown in Comparative Examples 1, 4, and 6 to 8, a grain strength (at 20.0%) of 3.5 MPa or less gave unfavorable results.

<Long Side Length of Primary Particles>

As shown in Examples 1 to 7 (see for example Examples 6 and 5), an average long side length of the primary particles of 1.7 to 3.2 μm gave favorable thermal conductivity and BN aggregated grain residual rate. In contrast as shown in Comparative Example 5, an average long side length of the primary particles of 1.3 μm or less gave unfavorable results and, as shown in Comparative Example 4, an average long side length of the primary particles of 4.0 μm or more also gave unfavorable results.

<Standard Deviation>

As shown in Examples 1 to 7 (see in particular Examples 4 and 5), a standard deviation of 1.0 μm or less gave favorable thermal conductivity and BN aggregated grain residual rate. In contrast as shown in Comparative Examples 1 and 4, a standard deviation of 1.3 μm or more gave unfavorable results.

TABLE 1

| | | | Example 1 | Example 2 | Example 3 | Example 4 | Example 5 | Example 6 | Example 7 |
|---|---|---|---|---|---|---|---|---|---|
| BN powder | BN powder | Average particle diameter μm | 45 | 22 | 80 | 45 | 45 | 45 | 45 |
| | BN aggregated grains | Grain strength MPa (63.2%) | 11 | 12 | 10 | 8.0 | 9.0 | 11 | 20 |
| | BN aggregated grains | Grain strength MPa (20.0%) | 7.0 | 7.5 | 6.5 | 4.6 | 5.0 | 7.0 | 13 |
| | Primary particles | Long side length | 2.5 | 2.1 | 2.5 | 2.5 | 3.2 | 1.7 | 2.5 |
| | Primary particles | Standard deviation | 0.7 | 0.6 | 0.7 | 1.0 | 1.0 | 0.7 | 0.4 |
| Thermal conductivity | | W/mK | 12 | 11 | 11 | 11 | 10 | 10 | 13 |
| BN aggregated grain residual rate | | | ○ | ○ | ○ | ○ | ○ | ○ | ○ |

TABLE 2

| | | | Comparative Example 1 | Comparative Example 2 | Comparative Example 3 | Comparative Example 4 |
|---|---|---|---|---|---|---|
| BN powder | BN powder | Average particle diameter μm | 45 | 10 | 110 | 45 |
| | BN aggregated grains | Grain strength MPa (63.2%) | 6 | 11 | 11 | 5.5 |
| | BN aggregated grains | Grain strength MPa (20.0%) | 3.5 | 7.0 | 7.0 | 3.0 |

TABLE 2-continued

|  |  |  | | | | |
|---|---|---|---|---|---|---|
| | Primary particles | Long side length | 2.7 | 2.5 | 2.5 | 4.0 |
| | Primary particles | Standard deviation | 1.3 | 0.7 | 0.7 | 1.3 |
| Thermal conductivity | | W/mK | 8 | 7 | Not available | 8 |
| BN aggregated grain residual rate | | | x | ○ | x | x |

| | | | Comparative Example 5 | Comparative Example 6 | Comparative Example 7 | Comparative Example 8 |
|---|---|---|---|---|---|---|
| BN powder | BN powder | Average particle diameter μm | 45 | 45 | 36 | 75 |
| | BN aggregated grains | Grain strength MPa (63.2%) | 11 | 7.5 | 7.8 | 3.5 |
| | BN aggregated grains | Grain strength MPa (20.0%) | 7.0 | 3.5 | 3.0 | 1.6 |
| | Primary particles | Long side length | 1.3 | 2.2 | 4.9 | 5.5 |
| | Primary particles | Standard deviation | 0.5 | 0.6 | 1.6 | 2.3 |
| Thermal conductivity | | W/mK | 8 | 8 | 8 | 7 |
| BN aggregated grain residual rate | | | ○ | x | x | x |

Note:
Comparative Example 2: boron carbide having an average particle diameter of 5 μm;
Comparative Example 3: boron carbide having an average particle diameter of 60 μm;
Comparative Example 6: boron carbide having a carbon content of 21.7%

Hereinafter, other embodiments of the present invention will be described in detail with reference to Examples, Test Examples, and Comparative Examples, and it should be understood that the invention is not restricted thereby.

Example 8

(Preparation of Boron Carbide)

100 parts of orthoboric acid (hereinafter boric acid) produced by Nihon Denko and 35 parts of acetylene black (HS100) produced by Denka Co., Ltd. were mixed in a Henschel Mixer and the mixture was placed in a graphite crucible and calcined in an arc furnace under an argon atmosphere at 2200° C. for 5 hours, to give a boron carbide ($B_4C$). The boron carbide lumps prepared were pulverized in a ball mill for 1 hour and sieved with a sieve screen into particles having a particle diameter of 75 μm or less. The particles were washed with aqueous nitric acid solution for removal of impurities such as iron, and filtered and dried, to give a boron carbide powder having an average particle diameter of 20 μm (carbon content: 20%).

(Pressure-Nitridating Step)

The boron carbide prepared was placed in a boron nitride crucible and incinerated in a resistance-heating furnace under a condition of a nitrogen gas atmosphere at 2000° C. and a pressure of 9 atmospheric pressure (0.8 MPa) for 10 hours, to give a boron carbide nitride ($B_4CN_4$).

(Decarburization Crystallization Step)

100 parts of the boron carbide nitride prepared and 200 parts of boric acid were mixed in a Henschel Mixer. The mixture was placed in a boron nitride crucible and heated from room temperature to 1000° C. at a heating rate of 10° C./min and from 1000° C. upward at a heating rate of 0.5° C./min in a resistance-heating furnace under a nitrogen gas atmosphere and additionally heated at a retention temperature of 2000° C. for a retention period of 10 hours under the condition of a pressure of 0.3 MPa, to give bulky boron nitride aggregated grains in which primary particles are aggregated.

The boron nitride aggregated grains prepared was pulverized in a mortar for 10 minutes and classified with a sieve screen and with a nylon sieve having a sieve opening of 75 μm.

Pulverization and classification of the incinerated product gave a boron nitride powder containing bulky boron nitride aggregated grains in which primary particles are aggregated (grain strength (at 20.0%): 13 MPa, average particle diameter: 45 μm, average long side length of the primary particles: 2.5 μm, standard deviation: 0.4 μm).

(Surface Treatment Condition)

The boron nitride powder prepared was subjected to surface modification treatment in a Henschel Mixer, under the condition of 1400 parts of aqueous hydrogen peroxide (water:hydrogen peroxide=1:0.05 (wt % with respect to 100 parts of boron nitride for 20 minutes. The treated slurry was sieved through a 75 μm sieve for removal only of the medium and the sieved slurry was filtered and washed. 1000 parts of isopropyl alcohol and 4 parts of a coupling agent KR-TTS (isopropyl triisostearoyl titanate) produced by Ajinomoto Fine-Techno Co., Ltd. were added to the wet cake after filtration with respect to 100 parts of boron nitride and the mixture was allowed to react at 70° C. for 3 hours for coupling treatment. The treated powder was filtered and washed and then dried at 80° C., to give a surface-treated aggregated boron nitride powder of Example 8.

Crosssectional observation of the surface-treated boron nitride aggregated grains under electron microscope showed that the powder contains aggregated hexagonal h-BN primary particles having an average long side length of the scaly hexagonal boron nitride primary particles at 2.5 μm and a standard deviation thereof at 0.4 μm.

(Mixing with Resin)

The surface-treated aggregated boron nitride powder obtained was mixed with 100 parts of a naphthalene-type epoxy resin (HP4032 produced by DIC) and 10 parts of a hardener imidazole (2E4MZ-CN produced by Shikoku Chemical Corporation) at a rate of 50 vol % and the mixture was applied on a PET sheet to a thickness of 1.0 mm and defoamed under a reduced pressure of 500 Pa for 10 minutes. The mixture was then heat-treated under pressure under a condition of a temperature of 150° C. and a pressure of 160 kg/cm² for 60 minutes, to give a 0.5-mm sheet.

Example 91

In Example 9, a surface-treated aggregated boron nitride powder of Example 9 was prepared under a condition similar to that in Example 8, except that a boron nitride powder containing boron nitride aggregated grains having a grain strength of 10 MPa was used as the raw material and the second-step heating rate in the decarburization crystallization step was changed to 2° C./min.

The raw material aggregated boron nitride powder had a grain strength (at 20.0%) of 7 MPa, an average particle diameter of 45 μm, an average long side length of the primary particles of 2.5 μm, and a standard deviation of 0.7 μm.

Crosssectional observation of the surface-treated boron nitride aggregated grains under electron microscope showed that the powder contains aggregated hexagonal h-BN primary particles, having an average long side length of the scaly hexagonal boron nitride primary particles at 2.5 μm and a standard deviation thereof at 0.7 μm.

Example 10

In Example 10, a boron nitride powder containing boron nitride aggregated grains having an average particle diameter of 80 μm of Example 10 was prepared under a condition similar to the steps from preparation of boron carbide to decarburization and crystallization of Example 8, except that: a boron carbide having an average particle diameter of 40 μm was prepared, as the pulverization for preparation of boron carbide in preparation of the boron carbide of Example 8 was performed for 0.5 hour and a sieve screen having an opening of 150 μm was used; and a sieve screen having an opening of 150 μm was used in the decarburization crystallization step.

The raw material aggregated boron nitride powder obtained had a grain strength (at 63.2%) of 20 MPa, a grain strength (at 20.0%) of 6.0 MPa, an average particle diameter of 80 μm, an average long side length of the primary particles at 2.5 μm, and a standard deviation thereof at 0.7.

In addition, a surface-treated aggregated boron nitride powder of Example 10 was prepared under a condition similar to the surface treatment condition in Example 8, except that the boron nitride powder containing boron nitride aggregated grains having an average particle diameter of 80 μm of Example 10 was used under the surface treatment condition of Example 8.

Example 11

In Example 11, a boron nitride powder containing boron nitride aggregated grains having an average particle diameter of 22 μm of Example 11 was prepared under a condition similar to the steps from preparation of boron carbide to decarburization and crystallization of Example 8, except that a boron carbide having an average particle diameter of 8 μm was prepared, as the pulverization period during preparation of the boron carbide was changed to 2 hours and the sieve screen used was changed to a sieve screen having an opening of 45 μm in preparation of the boron carbide of Example 8.

The raw material aggregated boron nitride powder had a grain strength (at 63.2%) of 20 MPa, a grain strength (at 20.0%) of 6.0 MPa, an average particle diameter of 22 μm, an average long side length of the primary particles at 2.0 μm and a standard deviation thereof at 0.7.

In addition, a surface-treated aggregated boron nitride powder of Example 11 was prepared under a condition similar to that of Example 8, except that a boron nitride powder containing boron nitride aggregated grains having an average particle diameter of 22 μm of Example 11 was used under the surface treatment condition of Example 8.

Example 12

In Example 12, a surface-treated aggregated boron nitride powder of Example 12 was prepared under a condition similar to that of Example 8, except that the amount of the coupling agent was changed to 30 parts.

Example 13

In Example 13, a surface-treated aggregated boron nitride powder of Example 13 was prepared under a condition similar to that of Example 8, except that the amount of the coupling agent was changed to 1 part.

Example 14

In Example 14, a surface-treated aggregated boron nitride powder of Example 14 was prepared under a condition similar to that of Example 8, except that the coupling agent used was changed to KR-46B (tetraoctyl-bis(ditridecyl phosphite) titanate) produced by Ajinomoto Fine-Techno Co., Ltd.

Example 15

In Example 15, a surface-treated aggregated boron nitride powder of Example 15 was prepared under a condition similar to that of Example 8, except that the coupling agent used was changed to X12-982S (polymeric epoxysilane-based) produced by Shin-Etsu Silicones.

Example 16

In Example 16, a surface-treated aggregated boron nitride powder of Example 16 was prepared under a condition similar to that of Example 8, except that the coupling agent used was changed to 3-glycidyloxypropyltrimethoxysilane produced by Tokyo Chemical Industry Co., Ltd.

Example 17

In Example 17, a surface-treated aggregated boron nitride powder of Example 17 was prepared under a condition similar to that of Example 8, except that the coupling agent used was changed to tetrakis(2,4-pentanedionato)zirconium (IV) [another name in Japanese: zirconium (IV) acetylacetonate)] produced by Tokyo Chemical Industry Co., Ltd.

Example 181

In Example 18, a surface-treated aggregated boron nitride powder of Example 18 was prepared under a condition similar to that of Example 8, except that the coupling agent used was changed to Orgatics AL-3200 [aluminum bisethylacetoacetate monoacetylacetonate (($C_5H_7O_2$) ($C_6H_9O_3$)$_2$)] produced by Matsumoto Fine Chemical Co., Ltd.

Example 191

A surface-treated aggregated boron nitride powder of Example 19 was prepared under a condition similar to that of Example 8, except that the coupling agent used under the surface treatment condition was changed to KBM-140 [p-styryltrimethoxysilane] produced by Shin-Etsu Silicones.

Example 201

A surface-treated aggregated boron nitride powder of Example 20 was prepared under a condition similar to that of Example 8, except that the coupling agent used under the surface treatment condition was changed to KBE-9007 [3-isocyanatopropyltriethoxysilane] produced by Shin-Etsu Silicones.

Example 21

A surface-treated aggregated boron nitride powder of Example 21 was prepared under a condition similar to that of Example 8, except that the coupling agent used under the surface treatment condition was changed to Z-6300 [vinyltrimethoxysilane] produced by Dow Corning Toray.

Example 22

A surface-treated aggregated boron nitride powder of Example 22 was prepared under a condition similar to that of Example 8, except that the coupling agent used under the surface treatment condition was changed to Z-6187 [cyclohexylmethyldimethoxysilane] produced by Dow Corning Toray.

Example 23

In Example 23, a surface-treated aggregated boron nitride powder of Example 23 was prepared under a condition similar to that of Example 8, except that 1400 parts of aqueous hydrogen peroxide (water:hydrogen peroxide=1: 0.05 (wt % ratio)) with respect to 100 parts of the boron nitride was changed to 1400 parts of aqueous nitrous acid (water:nitrous acid=1:0.05 (wt % ratio)) with respect to 100 parts of boron nitride.

Example 24

In Example 24, a surface-treated aggregated boron nitride powder of Example 24 was prepared under a condition similar to that of Example 8, except that 1400 parts of aqueous hydrogen peroxide (water:hydrogen peroxide=1: 0.05 (wt % ratio)) with respect to 100 parts of boron nitride was changed to 1400 parts of aqueous permanganate salt (water:permanganic acid salt=1:0.03 (wt % ratio)) with respect to 100 parts of boron nitride.

Test Example 1

In Test Example 1, a boron nitride powder containing boron nitride aggregated grains was prepared under a condition similar to that in Example 8 (in the steps from preparation of boron carbide to decarburization and crystallization), except that no surface modification treatment and no coupling treatment were performed.

Test Example 2

In Test Example 2, an aggregated boron nitride powder was prepared under a condition similar to that in Example 8, except that the coupling treatment was performed without the surface modification treatment in a Henschel Mixer during surface treatment.

Test Example 3

In Test Example 3, an aggregated boron nitride powder was prepared under a condition similar to that in Example 8, except that the second calcining rate during the decarburization crystallization was changed to 5° C./min and a boron nitride powder containing boron nitride aggregated grains having a grain strength of 8 MPa was used.

Test Example 4

In Test Example 4, an aggregated boron nitride powder was prepared under a condition similar to that in Example 14, except that the coupling treatment was performed without the Henschel Mixer treatment for surface modification during the surface treatment.

Test Example 5

In Test Example 5, an aggregated boron nitride powder was prepared under a condition similar to that in Example 15, except that the coupling treatment was performed without the Henschel Mixer treatment for surface modification during the surface treatment.

Test Example 6

In Test Example 6, an aggregated boron nitride powder was prepared under a condition similar to that in Example 17, except that the coupling treatment was performed without the Henschel Mixer treatment for surface modification during the surface treatment.

Test Example 7

In Test Example 7, an aggregated boron nitride powder was prepared under a condition similar to that in Example 18, except that the coupling treatment was performed without the Henschel Mixer treatment for surface modification during the surface treatment.

Test Example 8

In Test Example 8, an aggregated boron nitride powder was prepared under a condition similar to that in Example 18, except that the Henschel Mixer treatment was not performed for surface modification during the surface treatment and the coupling agent used was changed to Ken-React (trade name) KZ TPP (trade name) Zirconate produced by Kenrich, zirconium (IV) 2,2-bis(2-propenolatomethyl)butanolato, cyclo-di[2,2-(bis-2-propenolatomethyl)butanolato] pyrophosphato-O,O.

Test Example 9

In Test Example 9, an aggregated boron nitride powder was prepared under a condition similar to that in Example 8, except that a boron carbide having an average particle diameter of 5 μm was prepared, as the pulverization period of boron carbide preparation was elongated to 10 hours and a sieve screen having an opening of 45 μm was used. In addition, an aggregated boron nitride powder was prepared under a condition similar to that in Example 8, except that a boron nitride powder containing boron nitride aggregated grains having an average particle diameter of 10 μm was used under the surface treatment condition.

Results of Examples 8 to 25 and Examples 1 to 9 are summarized in Tables 3 and 4. The value of grain strength (at a cumulative breakdown rate of 63.2%) is shown as the grain strength (crushing strength) in Tables 3 and 4.

The raw material aggregated boron nitride powders used in Examples 8 and 9 are respectively equivalent to the boron nitride powders in Example 7 and Example 1 containing boron nitride aggregated grains that are formed by aggregation of primary particles.

The results shown in Tables 3 and 4 indicate the followings:

<Surface Treatment>

The aggregated boron nitride powders of Examples 8 to 24, which at least gave a viscosity of 40 Pa·s or less, were superior in filling property into resin. The aggregated boron nitride powders of Examples 8 to 24, which at least gave a viscosity of half or less, as compared with the aggregated boron nitride powder of Test Example 1 that was not surface-treated, could improve the filling property into resin of the aggregated boron nitride powder of Test Example 1.

As shown in Examples 8 to 24, the boron nitride aggregated grains showed favorable filling property into resin, even when the boron nitride aggregated grains had various organic functional groups provided on the surface by surface treatment.

As shown in Examples 8 to 24 (see for example Examples 1, 23, and 24), use of an oxidizer such as hydrogen peroxide, nitric acid, or permanganic acid in surface treatment leads to improvement in filling property into resin.

<Atm %> the boron nitride aggregated grains in Examples 8 to 24 (see for example Examples 12 and 3), which had at least Si, Ti, Zr, Ce, Al, Mg, Ge, Ga, and V in an amount of 0.1 atm % or more and 3.0 atm % or less in its composition on the surface of 10 nm, were superior in filling property into resin. In contrast, the boron nitride aggregated grains, for example in Test Examples 1, 2, and 4 to 8, which had the metal elements in an amount of detection limit or less in its composition on the surface of 10 nm, had an unfavorable viscosity of 85 Pa·s or more.

<Crushing Strength (Grain Strength (at 63.2%)>

As shown in Examples 8 to 24 (see for example Example 9), when the boron nitride aggregated grains after surface treatment had a grain strength (at 63.2%) of 5.0 MPa or more, the aggregated grains were superior in filling property into resin. In contrast as shown in Example 3, when the surface-treated boron nitride aggregated grains had a grain strength (at 63.2%) of 3 MPa, the aggregated grains were unfavorable, as they gave a viscosity of 60 Pa·s.

As shown in Examples 8 to 24, when the aggregated grains before treatment had a grain strength (at 63.2%) of 10 MPa or more, they gave a viscosity of half or less of the viscosity of Test Example 1. As shown in Test Example 3, when the aggregated grains before treatment had a grain strength (at 63.2%) of 8 MPa, the aggregated grains after surface treatment gave a viscosity of 60 Pa·s, which was 40% lower than the viscosity of Test Example 1. The result indicates that it is desirable to use boron nitride aggregated grains having a higher grain strength as the raw material for further improvement in filling property into resin of the aggregated boron nitride powder.

<Average Particle Diameter>

As shown in Examples 8 to 24 (see for example Examples 10 and 11), boron nitride aggregated grains having an average particle diameter of 20 to 80 μm after surface treatment were favorable in filling property into resin. In contrast as shown in Example 9, those having an average particle diameter of 10 μm after surface treatment were unfavorable, as they gave a viscosity of 60 Pa·s.

TABLE 3

| | | | Example 8 | Example 9 | Example 10 | Example 11 | Example 12 | Example 13 | Example 14 | Example 15 | Example 16 |
|---|---|---|---|---|---|---|---|---|---|---|---|
| BN aggregated grain | Raw material | Grain strength before treatment (63.2%) MPa | 20 | 10 | 20 | 20 | 20 | 20 | 20 | 20 | 20 |
| | After surface treatment | Grain strength after treatment (63.2%) MPa | 10 | 5 | 10 | 10 | 10 | 10 | 10 | 10 | 10 |
| | | Post-treatment average particle diameter μm | 45 | 45 | 80 | 20 | 45 | 45 | 45 | 45 | 45 |
| | | Post-treatment surface metal content atm % | 0.5 | 0.5 | 0.5 | 0.5 | 0.1 | 3 | 0.5 | 0.5 | 0.5 |
| | | Metal element | Ti | Ti | Ti | Ti | Ti | Ti | Ti | Si | Si |
| | | Post-treatment surface functional groups | ○ | ○ | ○ | ○ | ○ | ○ | ○ | ○ | ○ |
| Viscosity | Pa·S | | 20 | 30 | 20 | 40 | 25 | 20 | 20 | 20 | 20 |

| | | | Example 17 | Example 18 | Example 19 | Example 20 | Example 21 | Example 22 | Example 23 | Example 24 |
|---|---|---|---|---|---|---|---|---|---|---|
| BN aggregated grain | Raw material | Grain strength before treatment (63.2%) MPa | 20 | 20 | 20 | 20 | 20 | 20 | 20 | 20 |
| | After surface treatment | Grain strength after treatment (63.2%) MPa | 10 | 10 | 10 | 10 | 10 | 10 | 10 | 10 |
| | | Post-treatment average particle diameter μm | 45 | 45 | 45 | 45 | 45 | 45 | 45 | 45 |
| | | Post-treatment surface metal content atm % | 0.5 | 0.5 | 0.5 | 0.5 | 0.5 | 0.5 | 0.5 | 0.5 |

TABLE 3-continued

| | | Metal element | Zr | Al | Si | Si | Si | Si | Ti | Ti |
|---|---|---|---|---|---|---|---|---|---|---|
| | | Post-treatment surface functional groups | ○ | ○ | ○ | ○ | ○ | ○ | ○ | ○ |
| Viscosity | | Pa · S | 20 | 20 | 20 | 20 | 20 | 20 | 20 | 20 |

TABLE 4

| | | | Test Example 1 | Test Example 2 | Test Example 3 | Test Example 4 | Test Example 5 | Test Example 6 | Test Example 7 | Test Example 8 | Test Example 9 |
|---|---|---|---|---|---|---|---|---|---|---|---|
| BN aggregated grain | Raw material | Grain strength before treatment (63.2%) MPa | 20 | 20 | 8 | 20 | 20 | 20 | 20 | 20 | 20 |
| | After treatment | Grain strength after treatment (63.2%) MPa | — | 18 | 3 | 18 | 18 | 18 | 18 | 18 | 10 |
| | | Average particle diameter μm | 45 | 45 | 45 | 45 | 45 | 45 | 45 | 45 | 10 |
| | | Surface metal content atm % | detection limit or less | detection limit or less | 0.5 | detection limit or less | detection limit or less | detection limit or less | detection limit or less | detection limit or less | 0.5 |
| | | Metal element | Ti | Ti | Ti | Ti | Si | Zr | Al | Zr | Ti |
| | | Surface functional groups | x | x | ○ | x | x | x | x | x | ○ |
| Viscosity | | Pa · S | 100 | 90 | 60 | 90 | 90 | 85 | 85 | 85 | 60 |

INDUSTRIAL APPLICABILITY

Particularly preferably, the present invention relates to a boron nitride powder superior in thermal conductivity for use in resin compositions for the insulation layer of printed wiring boards and for thermal interface materials, a method for producing the same, and a thermally conductive resin composition comprising the same.

The present invention is used favorably, specifically as a raw material for heat-dissipating parts used in heat-generating electronic parts such as power devices.

The thermally conductive resin composition according to the present invention can be used widely, for example as a heat-dissipating part. The surface-treated aggregated boron nitride powder in another embodiment of the present invention can be used widely, for example as a heat-dissipating part.

The present technology includes the following aspects:

[1] A boron nitride powder comprising boron nitride aggregated grains that are formed by aggregation of hexagonal boron nitride that is scaly in primary particle: the powder having the following characteristics (A) to (C), (A) the primary particles of the scaly hexagonal boron nitride have an average long side length of 1.5 μm or more and 3.5 μm or less and a standard deviation of 1.2 μm or less;

(B) the boron nitride aggregated grains have a grain strength of 8.0 MPa or more at a cumulative breakdown rate of 63.2% and a grain strength of 4.5 MPa or more at a cumulative breakdown rate of 20.0%; and (C) the boron nitride powder has an average particle diameter of 20 μm or more and 100 μm or less.

[2] The boron nitride powder of [1] above, wherein the boron nitride powder of (C) above has an average particle diameter of 30 μm or more and 80 μm or less.

[3] A method for producing a boron nitride powder, comprising the following steps (a) and (b) of:

(a) pressure-nitridating and calcining a boron carbide having an average particle diameter of 6 μm or more and 55 μm or less and a carbon content of 18% or more and 21% or less and (b) heat-treating the boron carbide by heating it to a temperature allowing initiation of decarburization, heating it to a retention temperature at a temperature rising rate of 5° C./min or less, and heating it at a temperature of 1750° C. or higher for a period longer than 0.5 hour and shorter than 40 hours in a decarburization crystallization step after the pressure nitridation and calcination.

[4] The method for producing a boron nitride powder of [3] above, wherein the boron carbide is pressure-nitridated and calcined at a temperature of 1800° C. or higher and a pressure of 0.7 MPa or more and 1.0 MPa or less in the step (a).

[5] A thermally conductive resin composition, comprising the boron nitride powder described in [1] or [2] above.

[6] The boron nitride powder described in [1] or [2] above, wherein the boron nitride powder is prepared by the method for producing a boron nitride powder, comprising the following steps (a) and (b):

(a) pressure-nitridating and calcining a boron carbide having an average particle diameter of 6 μm or more and 55 μm or less and a carbon content of 18% or more and 21% or less and (b) heat-treating the boron carbide by heating it to a temperature allowing initiation of decarburization, heating it to a retention temperature at a temperature rising rate of 5° C./min or less, and heating it at a temperature of 1750° C. or higher for a period longer than 0.5 hour and shorter than 40 hours in a decarburization crystallization step after the pressure nitridation and calcination.

[7] The boron nitride powder described in [1], [2], or [6] above, wherein the boron carbide is pressure-nitridated and calcined at a temperature of 1800° C. or higher and a pressure of 0.7 MPa or more and 1.0 MPa or less in the step (a).

[8] A surface-treated aggregated boron nitride powder, that is prepared by using the boron nitride powder of [1], [2], [6], or [7] above as the raw material, adding an oxidizer to the aggregated boron particles, wet-pulverizing or wet-crushing the particles for surface modification treatment of the particles and allowing reaction of the particles with a metal coupling agent, the surface-treated aggregated boron nitride powder having the following characteristics (A) to (D):

(A) the surface-treated boron nitride aggregated grains are formed by aggregation of hexagonal h-BN primary particles;

(B) the surface-treated boron nitride aggregated grains have any one or more of Si, Ti, Zr, Ce, Al, Mg, Ge, Ga and V in an amount of 0.1 atm % or more and 3.0 atm % or less in its composition on the surface of 10 nm;

(C) the surface-treated boron nitride aggregated grains have a crushing strength of 5 MPa or more; and (D) the surface-treated aggregated boron nitride powder has an average particle diameter of 20 μm or more and 100 μm or less.

[9] The surface-treated aggregated boron nitride powder described in [8] above, wherein an oxidizer and a water-soluble solvent were added during the surface modification treatment.

[10] The surface-treated aggregated boron nitride powder described in [8] or [9] above, wherein the metal coupling agent is one or more selected from titanium coupling agents, silane coupling agents, zirconium coupling agents, and aluminum coupling agents.

[11] An aggregated boron nitride powder having the following characteristics (A) to (D):

(A) the boron nitride aggregated grains are formed by aggregation of hexagonal h-BN primary particles;

(B) the boron nitride aggregated grains have any one or more of Si, Ti, Zr, Ce, Al, Mg, Ge, Ga, and V in an amount of 0.1 atm % or more and 3.0 atm % or less in its composition on the surface of 10 nm;

(C) the boron nitride aggregated grains have a crushing strength of 5 MPa or more; and (D) the aggregated boron nitride powder has an average particle diameter of 20 μm or more and 100 μm or less.

[12] The aggregated boron nitride powder described in [11] above, having the following characteristic:

(E) the boron nitride aggregated grains have organic functional groups on the surface.

[13] The aggregated boron nitride powder described in [11] or [12] above, wherein the organic functional group present on the surface of the boron nitride aggregated grains is one or more selected from epoxy groups that may be substituted, styryl groups that may be substituted, alkyl groups that may be substituted, vinyl groups that may be substituted, acetylacetate groups that may be substituted, acyl groups that may be substituted, isocyanate groups that may be substituted, cyclohexyl groups that may be substituted, and tetraoctyl bis(ditridecyl phosphite) groups that may be substituted.

[14] A method for producing a surface-treated aggregated boron nitride powder comprising adding an oxidizer to a raw material bulky boron particles having an average particle diameter of 20 μm or more and 100 μm or less, a crushing strength of 10 MPa or more, wet-pulverizing or wet-crushing the mixture for surface modification treatment of the particles, and allowing a reaction thereof with a metal coupling agent.

[15] The method for producing a surface-treated aggregated boron nitride powder described in [14] above, wherein an oxidizer and a water-soluble solvent are added during the surface modification treatment.

[16] The method for producing a surface-treated aggregated boron nitride powder described in [14] or [15] above, wherein the metal coupling agent is one or more selected from titanium coupling agents, silane coupling agents, zirconium coupling agents, and aluminum coupling agents.

[17] A method for producing a surface-modified aggregated boron nitride powder, comprising adding an oxidizer to a raw material aggregated boron nitride powder having an average particle diameter of 20 μm or more and 100 μm or less and a crushing strength of 10 MPa or more and wet-pulverizing or wet-crushing the mixture for surface modification treatment of the particles.

[18] A surface-modified aggregated boron nitride powder, prepared by the method for producing a surface-modified aggregated boron nitride powder described in [17] above.

[19] A thermally conductive resin composition, comprising the aggregated boron nitride powder described in any one of [11] to [13] above.

The invention claimed is:

1. A surface-treated aggregated boron nitride powder comprising surface-treated boron nitride aggregated grains, wherein the surface-treated boron nitride aggregated grains are prepared by adding an oxidizer to boron nitride aggregated grains, wet-pulverizing or wet-crushing the boron nitride aggregated grains for surface modification treatment and allowing reaction of the boron nitride aggregated grains with a metal coupling agent to form surface-treated boron nitride aggregated grains, wherein the boron nitride aggregated grains are formed by aggregation of scaly hexagonal boron nitride primary particles, and have the following characteristics (a) to (c):

(a) the scaly hexagonal boron nitride primary particles have an average long side length of 1.5 μm or more and 3.5 μm or less and a standard deviation of 1.2 μm or less;

(b) the boron nitride aggregated grains have a grain strength of 8.0 MPa or more at a cumulative breakdown rate of 63.2% and a grain strength of 4.5 MPa or more at a cumulative breakdown rate of 20.0%; and (c) boron nitride powder of the surface-treated aggregated boron nitride powder has an average particle diameter of 20 μm or more and 100 μm or less, and wherein the surface-treated aggregated boron nitride aggregated grains have the following characteristics (A) to (C):

(A) the surface-treated boron nitride aggregated grains are formed by aggregation of hexagonal h-BN primary particles;

(B) the surface-treated boron nitride aggregated grains have any one or more of Si, Ti, Zr, Ce, Al, Mg, Ge, Ga, and V in an amount of 0.1 atm % or more and 3.0 atm % or less in its composition on a surface of 10 nm; and (C) the surface-treated boron nitride aggregated grains have a crushing strength of 5 MPa or more.

2. The surface-treated aggregated boron nitride powder according to claim 1, wherein the oxidizer and a water-soluble solvent are added during the surface modification treatment.

3. The surface-treated aggregated boron nitride powder according to claim 1, wherein the metal coupling agent is one or more coupling agents selected form the group consisting of titanium coupling agents, silane coupling agents, zirconium coupling agents, and aluminum coupling agents.

4. An aggregated boron nitride powder comprising boron nitride aggregated grains, wherein the boron nitride aggregated grains have the following characteristics (A) to (D):

(A) the boron nitride aggregated grains are formed by aggregation of hexagonal h-BN primary particles;

(B) the boron nitride aggregated grains have any one or more of Si, Ti, Zr, Ce, Al, Mg, Ge, Ga, and V in an amount of 0.1 atm % or more and 3.0 atm % or less in its composition on a surface of 10 nm, (C) the boron nitride aggregated grains have a crushing strength of 5 MPa or more; and (D) the aggregated boron nitride powder has an average particle diameter of 20 µm or more and 100 µm or less.

5. The aggregated boron nitride powder according to claim 4, wherein the boron nitride aggregated grains further have organic functional groups on the surface.

6. The aggregated boron nitride powder according to claim 5, wherein the organic functional group present on the surface of the boron nitride aggregated grains is one or more groups selected from epoxy groups that may be substituted, styryl groups that may be substituted, alkyl groups that may be substituted, vinyl groups that may be substituted, acetylacetate groups that may be substituted, acyl groups that may be substituted, isocyanate groups that may be substituted, cyclohexyl groups that may be substituted and tetraoctyl bis(ditridecyl phosphite) groups that may be substituted.

7. A thermally conductive composition, comprising the surface-treated aggregated boron nitride powder according to claim 1.

8. A thermally conductive composition, comprising the aggregated boron nitride powder according to claim 4.

* * * * *